(12) United States Patent
Qian et al.

(10) Patent No.: US 10,348,529 B2
(45) Date of Patent: Jul. 9, 2019

(54) METHOD AND APPARATUS FOR SIGNAL DETECTION IN A WIRELESS COMMUNICATION SYSTEM

(71) Applicant: Samsung Electronics Co., Ltd, Gyeonggi-do (KR)

(72) Inventors: Chen Qian, Beijing (CN); Bin Yu, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/488,292

(22) Filed: Apr. 14, 2017

(65) Prior Publication Data
US 2017/0310509 A1  Oct. 26, 2017

(30) Foreign Application Priority Data
Apr. 21, 2016  (CN) .......................... 2016 1 0252549

(51) Int. Cl.
*H04L 25/03* (2006.01)
*H04B 17/336* (2015.01)
(Continued)

(52) U.S. Cl.
CPC ..... *H04L 25/03012* (2013.01); *H04B 17/336* (2015.01); *H04L 25/0212* (2013.01);
(Continued)

(58) Field of Classification Search
CPC ............. H04L 25/0212; H04L 25/0224; H04L 25/03012; H04L 27/2605; H04L 27/265;
(Continued)

(56) References Cited

U.S. PATENT DOCUMENTS 6,774,829 B2 *  8/2004  Nakada ............... H04L 27/2662
                                                      341/126
7,415,081 B2 *  8/2008  Shinoda .............. H04L 27/2662
                                                      375/327
(Continued)

FOREIGN PATENT DOCUMENTS

EP          1330087 A2      7/2003

OTHER PUBLICATIONS

Javad Abdoli, et al., "Filtered OFDM: A New Waveform for Future Wireless Systems", IEEE 16th International Workshop on Signal Processing Advances in Wireless Communications (SPAWC), 2015, 5 pages.

(Continued)

*Primary Examiner* — Freshteh N Aghdam

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method for operating a receiving device in a wireless communication system comprises determining inter-symbol interference between symbols in a received signal, determining a location of a receive detection window according to the inter-symbol interference, and demodulating the received signal based on the location of the receive detection window. A receiving device includes at least one transceiver, and at least one processor configured to determine inter-symbol interference between symbols in a received signal, determine a location of a receive detection window according to the inter-symbol interference, and demodulate the received signal based on the location of the receive detection window. A transmitting device includes at least one processor configured to estimate an equivalent channel frequency response based on characteristic information of a time-domain filter, estimate an inter-symbol interference based on (Continued)

the equivalent channel frequency response, and generate indication information regarding an adjustment of a location of a receive detection window.

18 Claims, 21 Drawing Sheets

(51) Int. Cl.
*H04L 25/02* (2006.01)
*H04L 27/26* (2006.01)
(52) U.S. Cl.
CPC ...... *H04L 25/0224* (2013.01); *H04L 27/2605* (2013.01); *H04L 27/265* (2013.01)
(58) Field of Classification Search
CPC .............. H04L 27/2665; H04L 27/2691; H04L 25/022; H04L 27/2678
See application file for complete search history.

(56) References Cited

U.S. PATENT DOCUMENTS

| | | | |
|---|---|---|---|
| 2003/0185310 A1 | 10/2003 | Ketchum et al. | |
| 2008/0273583 A1 | 11/2008 | Song et al. | |
| 2010/0142664 A1* | 6/2010 | Araki | H04L 25/022 375/348 |
| 2011/0158342 A1* | 6/2011 | Srinivasan | H04L 25/0212 375/285 |
| 2012/0250801 A1 | 10/2012 | Lee et al. | |
| 2015/0063507 A1 | 3/2015 | Dore et al. | |
| 2015/0110207 A1* | 4/2015 | Murrin | H04L 27/2647 375/260 |

OTHER PUBLICATIONS

International Telecommunication Union, "Recommendation ITU-R M.2083-0, IMT Vision—Framework and Overall Objectives of the Future Development of IMT for 2020 and Beyond", Sep. 2015, 21 pages.
International Telecommunication Union, "Report ITU-R M.2320-0, Future Technology Trends of Terrestrial IMT Systems", Nov. 2014, 32 pages.
International Telecommunication Union, "SWG Traffic, Working Document Towards a Preliminary Draft New Report ITU-R M. [IMT ,BEYOND2020.TRAFFIC], IMT Traffic Estimates Beyond Year 2020", May 1, 2016, 35 pages.
International Search Report dated Jul. 18, 2017 in connection with International Patent Application No. PCT/KR2017/004162.
Written Opinion of the International Searching Authority dated Jul. 18, 2017 in connection with International Patent Application No. PCT/KR2017/004162.

* cited by examiner

METHOD AND APPARATUS FOR SIGNAL DETECTION IN A WIRELESS COMMUNICATION SYSTEM

CROSS-REFERENCE TO RELATED APPLICATION AND CLAIM OF PRIORITY

The present application is related to and claims priority under 35 U.S.C. § 119 to an application filed in the Chinese Intellectual Property Office on Apr. 21, 2016 and assigned Serial No. 201610252549.9, the contents of which are incorporated herein by reference.

TECHNICAL FIELD

The present disclosure relates to a wireless communication system, and more specifically, relates to method and apparatus for signal detection in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

For various scenarios in 5G, particularly for the narrowband service transmission methods or more in internet of things (IoT) scenarios, it is very necessary to correctly and efficiently detect a signal. For example, filtering of the signal would be required for a receiving device to detect a signal. However, such filtering should be performed properly to avoid distortion.

SUMMARY

To address the above-discussed deficiencies, it is a primary object to provide a method for operating a receiving device in a wireless communication system comprises determining inter-symbol interference between symbols in a received signal, determining a location of a receive detection window according to the inter-symbol interference, and demodulating the received signal based on the location of the receive detection window.

According to an embodiment of a present disclosure, a receiving device in a wireless communication system comprises at least one transceiver, and at least one processor configured to determine inter-symbol interference between symbols in a received signal, determine a location of a receive detection window according to the inter-symbol interference, and demodulate the received signal based on the location of the receive detection window.

According to an embodiment of a present disclosure, a transmitting device in a wireless communication system comprises at least one processor configured to estimate an equivalent channel frequency response based on characteristic information of a time-domain filter, estimate an inter-symbol interference based on the equivalent channel frequency response, and generate indication information regarding an adjustment of a location of a receive detection window based on the inter-symbol interference. The transmitting device further comprises at least one transceiver configured to transmit the indication information regarding the adjustment of the location of the receive detection window.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
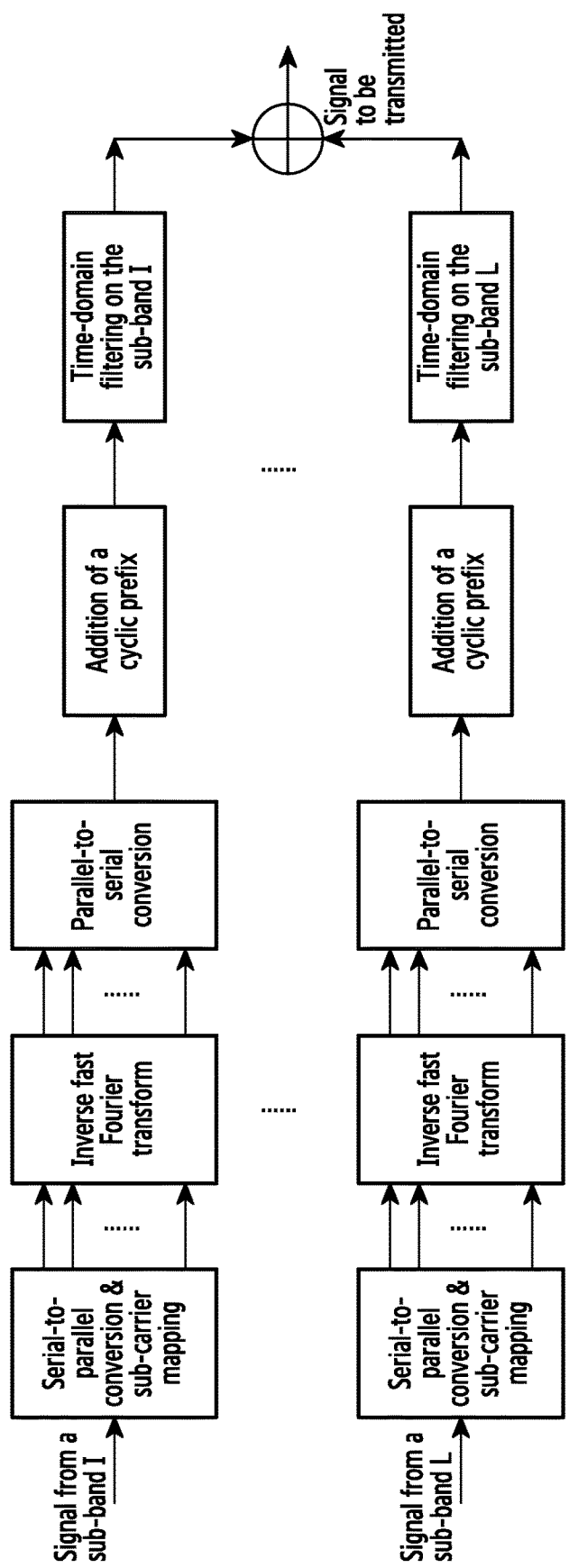
FIG. 1 is a structure diagram of a transmitting device for a filtering-based orthogonal frequency division multiplexing system according to the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The rapid development of information industry, particularly the increasing demand from the mobile Internet and the Internet of Things (IoT), brings about unprecedented challenges in the future mobile communications technology. According to the ITU-R M. [IMT.BEYOND 2020. TRAFFIC] issued by the International Telecommunication Union (ITU), it can be expected that, by 2020, mobile services traffic will grow nearly 1,000 times as compared with that in 2010 (4G era), and the number of user equipment connections will also be over 17 billion, and with a vast number of IoT equipments gradually expand into the mobile communication network, the number of connected equipments will be even more astonishing. In response to this unprecedented challenge, the communications industry and academia have prepared for 2020s by launching an extensive study of the fifth generation of mobile communications technology (5G). Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the report ITU-R M. [IMT. FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

Modulation waveform and multiple access modes are important foundations for designing wireless communication air-interfaces, and 5G will be no exception. At present, the typical example Orthogonal Frequency Division Multiplexing (OFDM) in the Multi-carrier Modulation (MCM) technological family has been widely used in the broadcasting-type audio and video fields and the communication systems for civilian use, for example, the Long Term Evolution (LTE) systems corresponding to the Evolved Universal Terrestrial Radio Access (E-UTRA) developed by the 3rd Generation Partnership Project (3GPP), European Digital Video Broadcasting (DVB) and Digital Audio Broadcasting (DAB), Very-high-bit-rate Digital Subscriber Loop (VDSL), IEEE802.11a/g Wireless Local Area (WLAN), IEEE802.22 Wireless Regional Area Network (WRAN) and IEEE802.16 World Interoperability for Microwave Access (WiMAX) and more. The basic idea of the OFDM technology is to divide a broadband channel into multiple parallel narrowband sub-channels or sub-carriers, so that a high-speed data stream transmitted in a frequency selective channel becomes low-speed data streams transmitted in the multiple parallel, independent and flat sub-channels. In this way, the capability of the system against the multipath interference is greatly enhanced, and OFDM can realize simplified multi-carrier modulation and demodulation by use of Inverse Fast Fourier Transform (IFFT) and Fast Fourier Transform (FFT); and then, by adding a Cyclic Prefix (CP), the linear convolution of the channel becomes circular convolution, and as a result, according to the properties of the circular convolution, when the length of the CP is larger than the maximum multipath time delay of the channel, the Inter-symbol interference (ISI) free reception can be realized by the simple single-tap frequency-domain equalization, and the processing complexity of the receiving device is thus reduced. Although CP-OFDM-based modulation waveform can well support the service requirements of Mobile Broadband (MBB) in 4G era, CP-OFDM shows great restrictions or deficiencies in application scenarios of 5G since 5G will face more challenging and various scenarios. Such restrictions or deficiencies are mainly manifested in the following. First, adding a CP to combat ISI will greatly decrease the spectrum utilization in 5G low-delay transmission scenarios. This is because low-delay transmission will greatly shorten the symbol length of OFDM, while the length of the CP is only limited by the impulse response of the channel, and in this case a ratio of the length of the CP to the symbol length of OFDM will be greatly increased. As a result, such an overhead causes very large spectrum efficiency loss. Low spectrum utilization is unacceptable. Second, the strict time synchronization requirement will cause a large signaling overhead required by closed-loop synchronization maintenance in IoT scenarios of 5G, and due to the strict synchronization mechanism, the structure of the data frames is not flexible so that it is unable to well support different synchronization requirements of various service. Third, the use of rectangular pulse shaping in OFDM will slow down the frequency-domain side-lobe roll-off and thus result in high out-of-band (OOB) emission. Hence, OFDM is quite sensitive to Carrier Frequency Offset (CFO). However, as for 5G, there will be many demands for flexible access and sharing of fragmented spectrum, the high OOB emission of OFDM significantly restricts the flexibility of spectrum access, or in other words, requires a very large frequency-domain guard band, and as a result, the utilization of spectrum is reduced. Those problems are mainly caused by its inherent characteristics. Although the influence of those problems can be reduced by taking some measures, the complexity of system design will be increased, and it is unable to solve those problems fundamentally.

To this end, as described in a report ITU-R M. [IMT. FUTURE TECHNOLOGY TRENDS] from the ITU, some new waveform modulation technologies, for example, multi-carrier-based modulation, have been taken into the consideration of 5G. Among others, the Filtered-OFDM (F-OFDM) modulation technology becomes one of the research focuses. The F-OFDM technology introduces time-domain filtering on the basis of OFDM. The F-OFDM technology introduces time-domain filtering on the basis of OFDM. By the design of a time-domain filter, F-OFDM can significantly reduce the OOB emission caused by filtering of the time-domain rectangular window, and also inherit some unique advantages of OFDM, for example, protection against frequency selective fading by adding a CP based on the complex field orthogonality between the sub-carriers, and etc. Good suppression against the OOB emission can well support the fragmented spectrum. Meanwhile, compared with other new waveform modulation technologies such as Filter-bank Multi-carrier (FBMC), by the complex field orthogonality between the sub-carriers, F-OFDM can provide better support to fading channels and multi-antenna systems. F-OFDM supports sub-band filtering, that is, the available frequency band can be divided into non-overlapped sub-bands, and the sub-bands can use a different multi-carrier modulation parameter comprising sub-carrier spacing, CP length or more. In order to avoid the interference between sub-bands, several or no sub-carriers can be inserted between different sub-bands as guard bands which are allocated to different services or different users. The filtering processing based on sub-bands improves the spectrum utilization of the system and the flexibility of use of spectrum.

Due to the above excellent properties, F-OFDM becomes one of new waveform modulation technological candidates of 5G. However, F-OFDM itself still has some problems. Specifically, for F-OFDM, time-domain filtering is performed on OFDM symbols added with a CP, and as a result, the filtered OFDM symbols are extended in time-domain. Meanwhile, in order to improve the performance of reducing the OOB emission of F-OFDM, a long time-domain filter is usually used. For example, in the publication [Filtered OFDM: A New Waveform for Future Wireless Systems], the length of the used time-domain filter is half of that of OFDM symbols. Consequently, the inter-symbol interference is caused between the adjacent symbols, and the system BER performance is degraded. Although the influence of this problem can be mitigated by designing a time-domain filter that the main energy of the filter is concentrated within a certain range, in some scenarios, for example, when the bandwidth of a sub-band is narrow or when the modulation order of the used symbol modulation mode is high, the effect of inter-symbol interference caused by the extension of symbols in time-domain due to filtering cannot be ignored, or even worse, can result in an error floor.

In conclusion, in order to improve the competitiveness of F-OFDM as technological candidates of 5G, it is necessary to address its deficiencies in addition to development of its advantageous features. For various scenarios in 5G, particularly for the narrow-band service transmission methods or more in IoT scenarios, it is very necessary to solve the inter-symbol interference caused by the extension of symbols due to time-domain filtering to wireless communication systems in F-OFDM.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

Figure 2:
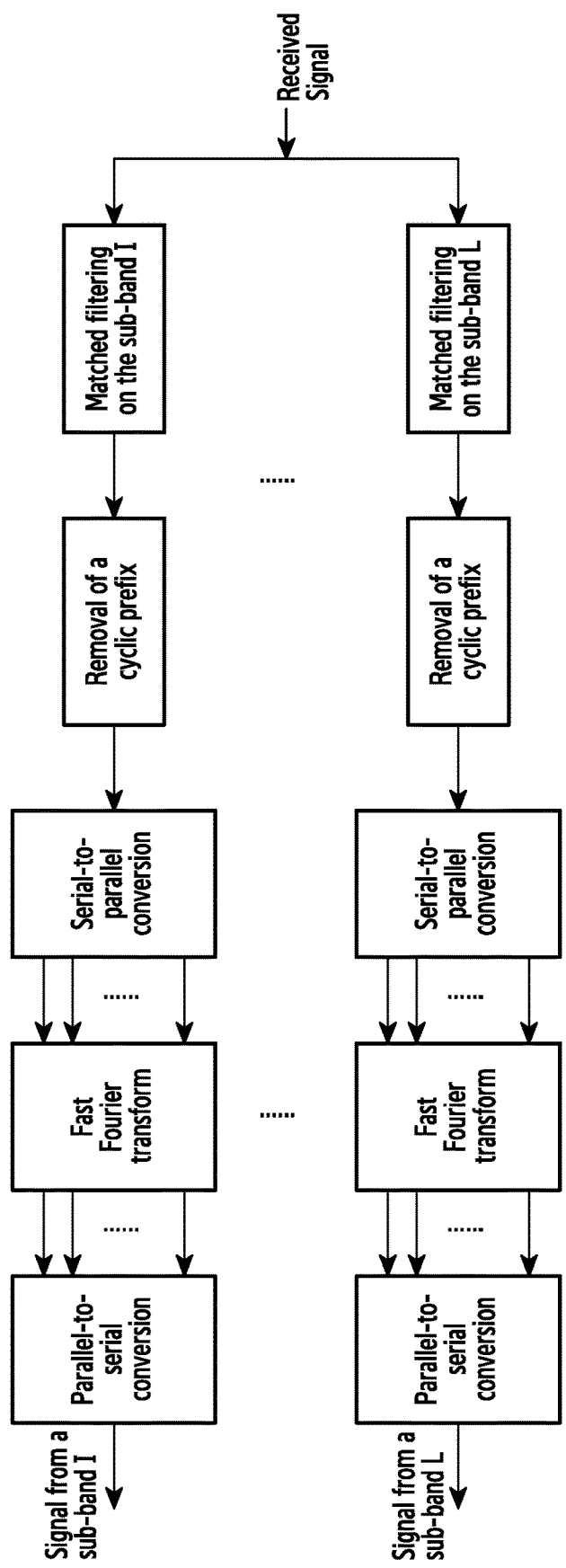
FIG. 2 is a structure diagram of a receiving device for a filtering-based orthogonal frequency division multiplexing system according to the present disclosure.

As shown in FIGS. 1 to 3, the implementation of the F-OFDM technology is introduced.

FIG. 1 shows a structure block diagram of a transmitting device in the F-OFDM technology. The available band is divided into L sub-bands according to service requirements or the category of a User Equipment (UE) to be served. Each sub-band can use different multi-carrier modulation parameters, for example, different sub-carrier spacing, different CP length or more. For each sub-band, the input signal is a complex signal having passed through channel coding and symbol modulation, wherein the symbol modulation comprises mode of QAM, PSK or more. The complex signal, input by each path of sub-bands, passes through serial-to-parallel conversion and then sub-carrier mapping according to the sub-carrier locations of the sub-bands, to map the data onto the allocated sub-carriers, and zero-padding is performed on the remaining sub-carriers; and then, N-point IFFT is performed to obtain a time-domain signal. The signal having passed through IFFT passes through parallel-to-serial conversion and then added with a CP, and the conventional CP-OFDM modulation process is completed. In order to reduce the interference between sub-bands, time-domain filtering will be performed on each sub-band at the end of the OFDM modulation, that is, each sub-band will be filtered by a time-domain filter to reduce the OOB emission. In this way, the interference between sub-bands due to a different carrier modulation parameter can be significantly reduced at the cost of a very small guard band. There can be a multiple of transmitting devices in the system, and each transmitting device can occupy a multiple of sub-bands. For the convenience of description, without loss of generality, it is assumed that each transmitting device occupies only one sub-band and the transmitting device is indicated by a sub-band index. A transmitted signal from a sub-band l can be expressed by the following formula:

$$s_l[n] = \Sigma_{t=0}^{T-1} s_{l,t}[n-t(N+N_{CP})]$$

where $s_{l,t}[n]$ is the $t^{th}$ time-domain signal obtained from the sub-band l having passed through the OFDM modulation, and can be expressed by the following formula:

$$s_{l,t}[n] = \Sigma_{m=m_1}^{m_1+M_l-1} d_{t,m} e^{j2\pi mn/N}, -N_{CP} \leq n < N$$

where $N_{CP}$ is a CP length, $d_{t,m}$ represents a data symbol transmitted by the $m^{th}$ sub-carrier on the $t^{th}$ sub-band, and the range of sub-carriers occupied by the sub-band l is from $m_1^{th}$ sub-carrier to $(m_1+M_1-1)^{th}$ sub-carrier. The signal obtained by time-domain filtering is expressed by:

$$\tilde{s}_l[n] = f_l[n] * s_l[n]$$

where $f_l[n]$ is a time-domain filter for the sub-band l, and the symbol * represents an linear convolution operation.

FIG. 2 shows a structure block diagram of a receiving device in the F-OFDM technology. The receiving device first performs sub-band-level matched filtering on a received signal, and then performs OFDM demodulation as shown in FIG. 2 on the signal of each sub-band, specifically including removal of a cyclic prefix, parallel-to-serial conversion, discrete Fourier transform and serial-to-parallel conversion, to obtain an estimated value of the signal transmitted by each sub-band. If the time-domain impulse response of the sub-band filter for the sub-band l is $f_l[n]$, the time-domain impulse response of the corresponding matched filter is $f_l^*[-n]$, where the superscript * represents conjugation operation.

After the sub-band matched filtering, the time-domain received signal of the sub-band l can be expressed by:

$$r_l[n] = f^*[-n] * h_l[n] * \tilde{s}_l[n] = f^*_l[-n] * h_l[n] * f_l[n] * s_l[n]$$

In the formula, it is assumed that signals from other sub-bands can be distinguished by sub-band filtering and subsequent frequency-domain operations. In the formula, it is required to estimate a frequency response of an equivalent channel $f_l^*[-n] * h_l[n] * f_l[n]$ having passed through sub-band filtering and sub-band matched filtering, for subsequent data demodulation. Where, $h_l[n]$ represents the channel impulse response, the operator * represents linear convolution, and the superscript * represents complex conjugation operation.

Figure 3A:
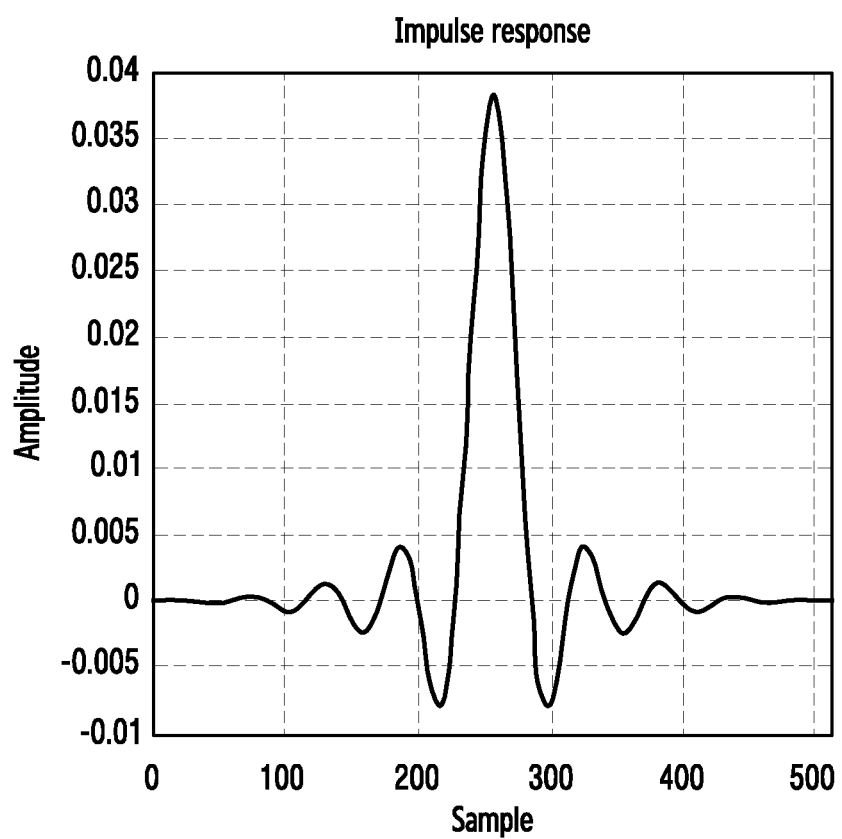
FIG. 3A and FIG. 3B are schematic diagrams of time-domain impulse response and frequency-domain response of a window function used in F-OFDM according to the present disclosure.

The design of the time-domain filter can be completed by the window function soft clipping of a sinc function with a window function. For example, on the basis of the sinc function, soft clipping is performed by a Hanning window. The resulting impulse response of time-domain filter and the corresponding frequency-domain response are as shown in FIG. 3A and FIG. 3B.

The F-OFDM has many advantages. For example, the F-OFDM has a low OOB emission, and can support sub-band-level filtering, can allow the use of different carrier modulation parameters among different sub-bands, and can effectively utilize spectrum fragments to improve the spectrum efficiency. These advantages makes the F-OFDM become a competitive novel waveform technology. However, the F-OFDM still have some disadvantages which will limit its application in some scenarios. One disadvantage is that the time-domain filtering will cause symbol extension and thus result in inter-symbol interference.

Figure 3B:
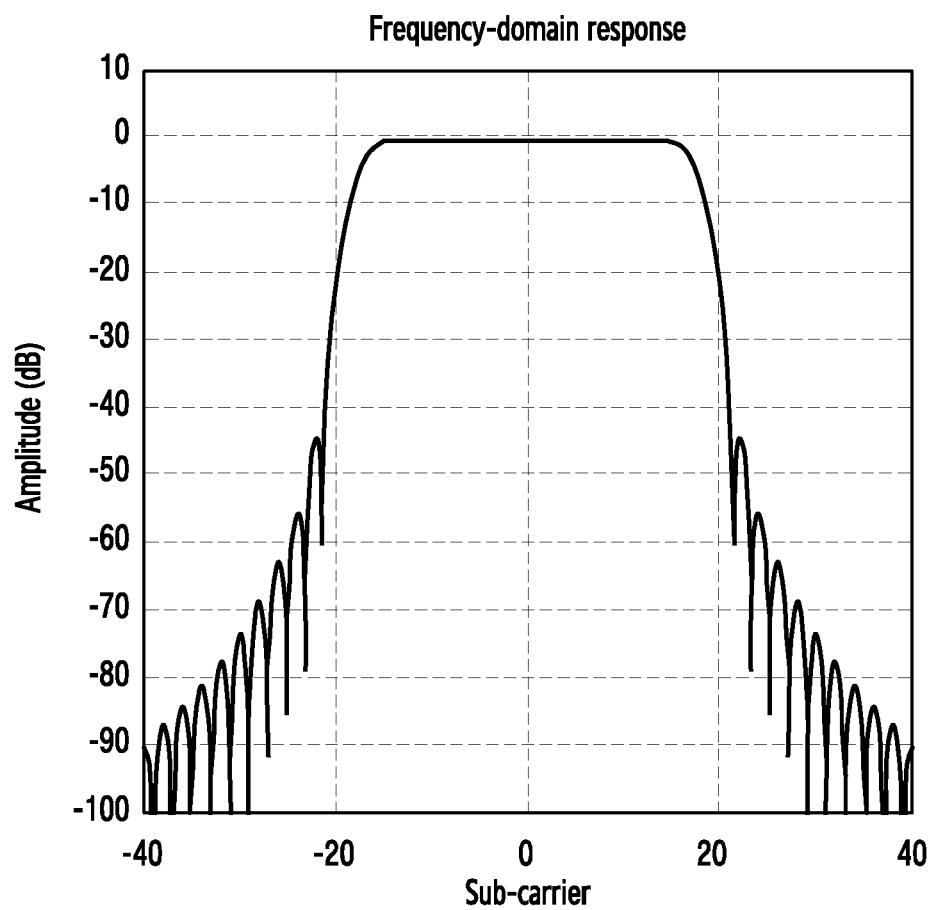

It can be seen from FIG. 3B that the OOB emission of the window function used in F-OFDM is far less than that of the OFDM system. In this way, sub-band-level filtering can be achieved, where a different sub-band uses a different multi-carrier parameter, for example, different sub-carrier spacing, different CP length or more. FIG. 3A shows the time-domain impulse response h[n] of the used window function, where n represents a sample. It can be seen that this time-domain filter has a long tail, and this will cause the extension of time-domain symbols after time-domain filtering and thus result in inter-symbol interference between a previous symbol and a next symbol. By designing the filter, the energy of the filter can be concentrated so as to reduce the influence of the extension of time-domain symbols due to filtering. Since the bandwidth of frequency response of the filter determines the energy distribution of the time-domain impulse response, for a system with a wide sub-band bandwidth, the energy of the time-domain filter is more concentrated, and in this case, the influence of the extension of time-domain symbols due to filtering is less; but for a narrow sub-band bandwidth, the energy of the time-domain filter is scattered, and in this case, the influence of the extension of time-domain symbols will be more significant.

Existing solutions comprise adding an additional cyclic prefix. This can be considered as increasing the length of the cyclic prefix, for purpose of resisting against inter-symbol interference from a previous symbol and a next symbol. However, this way will bring additional overhead, and thus serious spectrum efficiency loss will be caused in a low-delay scenario with a large sub-carrier spacing.

In order to reduce the inter-symbol interference resulted from symbol extension caused by time-domain filtering and improve the link reliability, the present disclosure provides a filtering-based carrier modulation signal receiving method. In this method, the location of a receive detection window is adaptively adjusted by a receiving device according to the estimation of the symbol extension caused by a channel and a filter, so that the inter-symbol interference is reduced.

Figure 4:
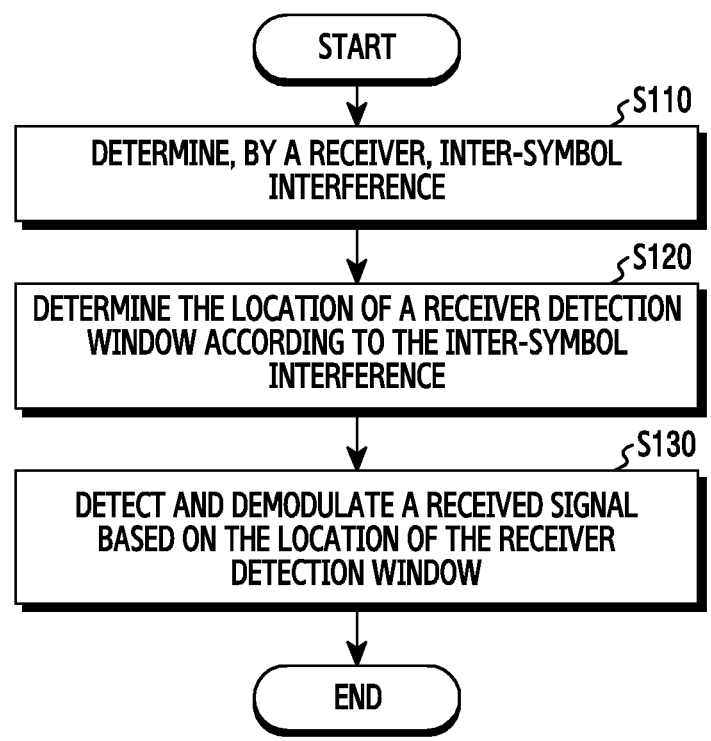
FIG. 4 is a schematic flowchart of a filtering-based carrier modulation signal receiving method according to an embodiment of the present disclosure.

FIG. 4 is a schematic flowchart of a filtering-based carrier modulation signal receiving method.

At step S110, inter-symbol interference between symbols in a received signal is determined by a receiving device. At step S120, the location of a receive detection window is determined according to the inter-symbol interference. At step S130, a received signal is detected and demodulated based on the location of the receive detection window.

Wherein, the subsequent detection and demodulation specifically comprises demodulation of a carrier modulation signal, or more.

Further, the carrier modulation comprises orthogonal frequency division multiplexing and single carrier frequency division multiplexing.

Specifically, with respect to any symbol, the receiving device estimates inter-symbol interference from a previous symbol and inter-symbol interference from a next symbol, and determines the proper location of a receive detection window function according to estimated values of the inter-symbol interference. According to the location of the receive detection window, the receiving device detects and demodulates an F-OFDM signal. Specifically, after receiving device sub-band matched filtering, the receiving device slides the location of the receive detection window while removing a CP according to the estimation of the inter-symbol interference, so as to minimize the inter-symbol interference within the receive detection window, as shown in FIG. 5.

Figure 5:
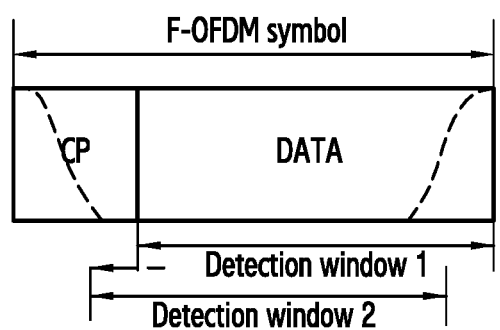
FIG. 5 is a schematic diagram of sliding a receive detection window according to the present disclosure.

In FIG. 5, the location of a receive detection window 1 is the initial location of the receive detection window, i.e., the location of the receive detection window in the conventional receiving mode. The receiving device slides the location of the receive detection window to a receive detection window 2 according to the estimation of the inter-symbol interference. It can be seen that the inter-symbol interference in the receive detection window 2 is significantly lower than that in the receive detection window 1, so that a better BER performance can be achieved and the link reliability of the system can be improved.

Specifically, the equivalent channel frequency response estimation is an equivalent channel frequency response estimation having passed through transmitting device time-domain filtering, an actual physical channel and receiving device matched filtering, or an equivalent frequency response estimation having passed through transmitting device time-domain filtering and an actual physical channel.

At step S110, a way of determining inter-symbol interference by a receiving device comprises the following cases:

1) receiving, by the receiving device, estimation information of inter-symbol interference from a transmitting device, the estimation information being determined by the transmitting device based on characteristic information of a time-domain filter; and 2) estimating, by the receiving device, an equivalent channel frequency response based on a received reference signal, and determining inter-symbol interference according to the equivalent channel frequency response (that is, estimating an equivalent channel frequency response based on a received reference signal and determining the inter-symbol interference based on the equivalent channel frequency response), wherein the equivalent channel frequency response is an estimation of equivalent channel frequency response comprising transmitting device time-domain filtering, an actual physical channel and receiving device matched filtering, or an estimation of equivalent channel frequency response comprising transmitting device time-domain filtering and an actual physical channel (that is the equivalent channel frequency response is an estimation of a channel frequency response through a transmitting device time-domain filtering, an actual physical channel and receiving device matched filtering, or through a transmitting device time-domain filtering, an actual physical channel).

With respect to the case 2), the step of estimating inter-symbol interference according to the equivalent channel frequency response comprises: calculating an equivalent time-domain channel impulse response according to the equivalent channel frequency response; and, estimating inter-symbol interference according to the equivalent time-domain channel impulse response.

Preferably, with respect to any symbol, inter-symbol interference from a previous symbol and inter-symbol interference from a next symbol are estimated according to the equivalent time-domain channel impulse response.

More preferably, with respect to any symbol, a first symbol extension from the previous symbol and a second symbol extension from the next symbol are estimated according to the equivalent time-domain channel impulse response; and, with respect to any symbol, inter-symbol interference from the previous symbol and inter-symbol interference from the next symbol are estimated according to the first symbol extension, the second symbol extension and the corresponding power of time-domain channel impulse response.

Wherein, the first symbol extension is a symbol extension generated by the previous symbol with respect to any current symbol, and the second symbol extension is a symbol extension generated by the next symbol with respect to any current symbol; and, with respect to any symbol, inter-symbol interference from the previous symbol and inter-symbol interference from the next symbol are estimated by using the first symbol extension generated by the previous symbol with respect to any current symbol, the second symbol extension generated by the next symbol with respect to any current symbol and the corresponding power of time-domain channel impulse response.

Preferably, the step of, with respect to any symbol, estimating a first symbol extension from the previous symbol according to the equivalent time-domain channel impulse response comprises:

with respect to any symbol, determining a maximum sample value corresponding to a maximum value of the power of time-domain channel impulse response of the previous symbol; determining a first sample value of the previous symbol according to the equivalent time-domain channel impulse response, the power of time-domain channel impulse response of sample values following the first sample value being lower than a pre-defined first power threshold; and, extracting the number of samples between the first sample value and the maximum sample value as the first symbol extension from the previous symbol with respect to any symbol.

With respect to any symbol, a maximum sample value corresponding to a maximum value of the power of time-domain channel impulse response of the next symbol is determined; a second sample value of the next symbol is determined according to the equivalent time-domain channel impulse response, the equivalent time-domain channel impulse response power of sample values before the second sample value being lower than a pre-defined second power threshold; and, the number of samples between the maximum sample value and the second sample value is extracted as the second symbol extension from the next symbol with respect to any symbol.

Wherein, the first power threshold is equal to or not equal to the second power threshold. The first power threshold and the second power threshold are determined by a modulation and coding scheme (MCS) of an input signal of a transmitting device; and, when a modulation order of the modulation and coding scheme increases, the first power threshold and/or the second power threshold will decrease correspondingly.

Preferably, the step of, with respect to any symbol, estimating inter-symbol interference from the previous symbol and inter-symbol interference from the next symbol according to the first symbol extension, the second symbol extension and the corresponding equivalent time-domain channel impulse response power comprises:

with respect to any symbol, determining, as an estimated value of the inter-symbol interference from the previous symbol, a sum of corresponding equivalent channel time-domain pulse response powers within a sample interval using a starting point value of a sample region to be estimated as a starting point and the first symbol extension as a length, and determining, as an estimated value of the inter-symbol interference from the next symbol, a sum of corresponding equivalent channel time-domain pulse response powers within a sample interval using an ending point value of the sample region to be estimated as an ending point and the second symbol extension as a length; and, determining a sum of the two sums as an estimated value of the inter-symbol interference from the previous symbol and the inter-symbol interference from the next symbol with respect to any symbol, wherein the estimated value of the inter-symbol interference of the sample region to be estimated is a basis for determining the location of the receive detection window with respect to any symbol.

At step S120, a sample interval having a minimum estimated value of the inter-symbol interference and using discrete Fourier transform size as a length is determined as the location of the receive detection window.

Preferably, when the carrier modulation signal is a multi-carrier modulation signal, At step S120, a difference between the length of the multi-carrier modulation symbol added with a cyclic prefix, the first symbol extension and the second symbol extension are calculated, and a result of calculation is determined as a symbol length without inter-symbol interference; if the symbol length without inter-symbol interference is less than the discrete Fourier transform size, a sample interval having a minimum estimated value of the inter-symbol interference and using discrete Fourier transform size as a length is determined as the location of the receive detection window; and, if the symbol length without inter-symbol interference is not less than the discrete Fourier transform size, a region having a length equal to the discrete Fourier transform size is selected, from sample regions without inter-symbol interference, as the location of the receive detection window.

In other words, To determine the location of the receive detection window based on the inter-symbol interference, the receiving device calculates a difference between a length of a multi-carrier modulation symbol added with a cyclic prefix, a first symbol extension of a previous symbol associated with the inter-symbol interference and a second symbol extension of a next symbol associated with the inter-symbol interference, and determines a result of the calculation as a symbol length without inter-symbol interference. If the symbol length without inter-symbol interference is less than the discrete Fourier transform size, the receiving device determines, as the location of the receive detection window, a sample interval with a minimum estimated value of the inter-symbol interference and using discrete Fourier transform size as a length. In contrast, if the symbol length without inter-symbol interference is not less than the discrete Fourier transform size, the receiving device determines a region with a length equal to the discrete Fourier transform size from sample regions without inter-symbol interference as the location of the receive detection window.

Wherein, a starting point of the location of the receive detection window is located within the cyclic prefix.

In a preferred embodiment, inter-symbol interference generated to the previous symbol by any symbol and inter-symbol interference generated to the next symbol by this symbol are estimated according to the equivalent time-domain channel impulse response; an estimated value of the inter-symbol interference generated to the next symbol by this symbol is determined as a first estimated value of the inter-symbol interference generated to the next symbol by a symbol before the next symbol, and the inter-symbol interference generated to the previous symbol by this symbol is determined as a second estimated value of the inter-symbol interference generated to the next symbol by a symbol following the next symbol; and, the location of the receive detection window of the next symbol is determined based on the first estimated value and the second estimated value.

Preferably, At step S130, after determining the location of the receive detection window of any symbol, the location of the receive detection window is applied to data detection and demodulation of a multiple of subsequent symbols within a predetermined time period.

More preferably, after determining the location of a receive detection window of any symbol, a Signal-to-Interference-Plus-Noise Ratio (SINR) of a frequency-domain received signal is calculated; and, if the SINR is lower than a predetermined SINR threshold, the location of the receive detection window of a next symbol is determined by using the inter-symbol interference estimation for this symbol.

In other words, to demodulate the received signal based on the location of the receive detection window, the receiving device calculates a signal-to-interference-plus-noise ratio (SINR) of the received signal. If the SINR is lower than a pre-defined SINR threshold, the receiving device determines the location of the receive detection window of a next symbol by using the inter-symbol interference estimation for a previous symbol.

Preferably, the receiving method further comprises: when an estimated value of inter-symbol interference corresponding to any location of the receive detection window is greater than a third power threshold, transmitting, by the receiving device, a request to transmit an additional symbol. Wherein, if the estimated value of the inter-symbol interference in the first symbol extension is greater than a pre-defined first estimation threshold, the request to transmit an addition symbol is a request to add an extended cyclic prefix; and, if the estimated value of the inter-symbol interference in the second symbol extension is greater than a pre-defined second estimation threshold, the request to transmit an addition symbol is a request to add a cyclic postfix.

Wherein, a way of receiving a received signal added with an additional symbol by the receiving device comprises the following situations:

1) receiving, by the receiving device, a parameter indication of adding an additional symbol to the transmitted signal, wherein the parameter indication comprises a length of the cyclic prefix or a length of the cyclic postfix; receiving, by the receiving device, a received signal added with the additional symbol, based on the parameter indication; and, estimating the equivalent channel frequency response based on a reference signal added with the additional symbol; and 2) after a predetermined number of symbols, receiving, by the receiving device, a received signal added with the additional symbol.

Preferably, the receiving method further comprises: receiving, by the receiving device and from a transmitting device, indication information about adjustment to the location of a receive detection window; and, by the receiving device, according to the inter-symbol interference and in combination with the received indication information about adjustment to the location of the receive detection window, determining the location of the receive detection window.

In other words, the receiving device can receive indication information regarding an adjustment of the location of a receive detection window. To determine the location of the receive detection window based on the inter-symbol interference, the receiving device can determine the location of the receive detection window based on the inter-symbol interference and the received indication information regarding the adjustment of the location of the receive detection window Wherein, the indication information about adjustment to the location of the receive detection window is determined by inter-symbol interference that is estimated by the transmitting device according to the characteristic information of the time-domain filter; or, the indication information about adjustment to the location of the receive detection window is determined by inter-symbol interference that is estimated by the transmitting device according to the characteristic information of the time-domain filter and in combination with channel state information.

Wherein, the indication information about adjustment to the location of the receive detection window comprises indication information about an estimated value of the forward-shift amount of the location of the receive detection window or indication information about an estimated value of the inter-symbol interference.

Embodiment 1

In this embodiment, an F-OFDM receiving system capable of adaptively adjusting the location of a receive detection window will be described in detail with reference to a specific system configuration. The available bandwidth of the system is BW. The system divides the available bandwidth into L sub-bands according to the service requirements of UEs or the number of UEs to be served, determines multi-carrier modulation parameters (including sub-carrier spacing or more) used in each sub-band, and allocates the L sub-bands to the UEs according to the service requirements.

Figure 6:
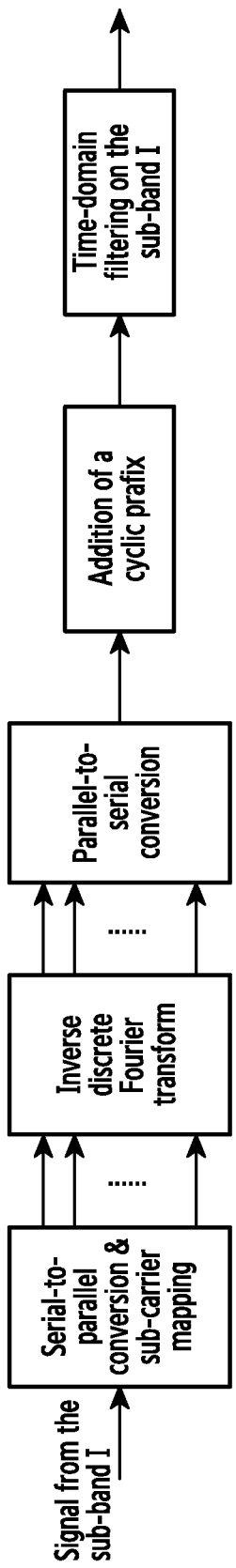
FIG. 6 is a structure diagram of a transmitting device for a sub-band 1 according to Embodiment 1 of the present disclosure.

FIG. 6 shows a block diagram of a transmitting device for a sub-band l. Wherein, the block diagram of the transmitting device in FIG. 6 is the same as the block diagram of a transmitting device for a conventional F-OFDM system, and will not be repeated here.

Figure 7:
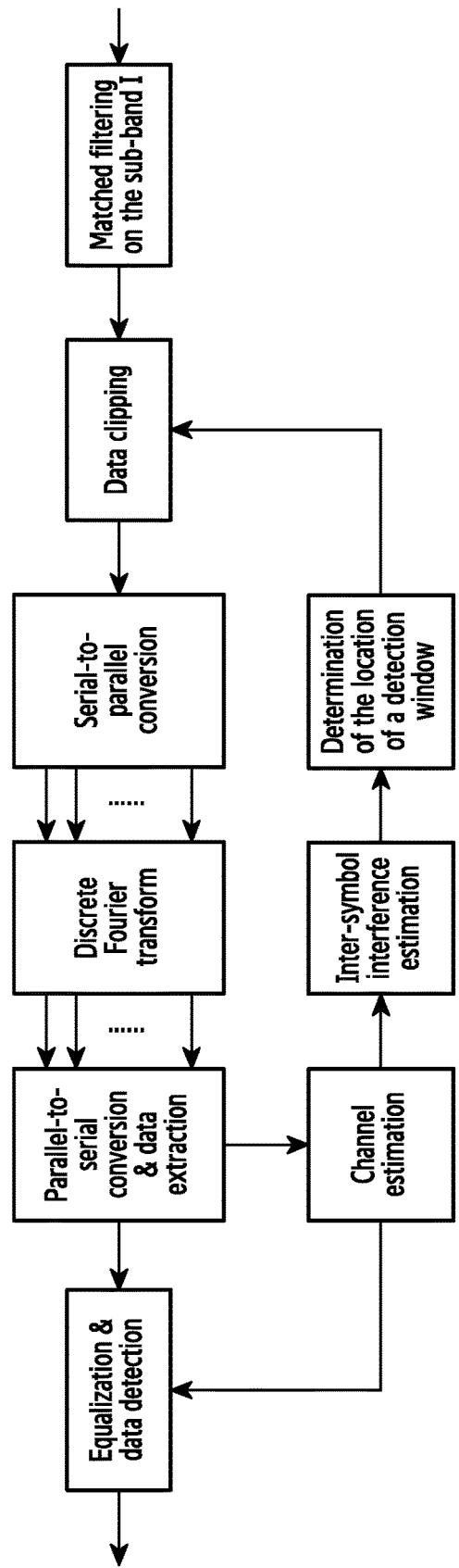
FIG. 7 is a structure diagram of a receiving device for the sub-band 1 according to Embodiment 1 of the present disclosure.

FIG. 7 shows a block diagram of a receiving device capable of adaptively adjusting the location of a receive detection window of the sub-band l. After a received signal has passed through matched filtering of the sub-band l, windowing clipping is performed on data. Subsequently, serial-to-parallel conversion, discrete Fourier transform and parallel-to-serial conversion are performed on the obtained signal. Data and a reference signal are separately extracted according to the time-frequency resource allocation for sub-band data and reference signals. An equivalent channel having passed through time-domain filtering, an actual physical channel and receiving device matched filtering is estimated by using the reference signal. The equivalent channel estimation is used for sub-carrier-by-sub-carrier single-tap equalization of the data, and subsequent data detection and other processes. Meanwhile, based on the equivalent channel estimation, the receiving device estimates inter-symbol interference of the equivalent channel, and then determines the location of the receive detection window according to the inter-symbol interference estimation, for use in the subsequent symbol data clipping step.

The inter-symbol interference estimation can employ a frequency response estimation of the equivalent channel. Specifically, an equivalent channel frequency response estimation on a sub-carrier inserted with the reference signal is obtained according to the reference signal. Based on these estimations, an equivalent channel frequency response estimation on a sub-carrier not inserted with the reference signal is obtained by an interpolation algorithm or more, so that an equivalent channel frequency response estimation $\overline{H}[k]$ on the whole sub-band is obtained, where k represents a sub-carrier index. Inverse discrete Fourier transform is performed on the $\overline{H}[k]$ to obtain an equivalent time-domain channel impulse response estimation $\overline{h}[n]$, where n represents the number of time-domain samples. Since the F-OFDM generally uses a long time-domain filter, the actual equivalent time-domain channel impulse response is long. However, to avoid large inter-symbol interference, a time-domain filter with concentrated energy is generally selected, so the energy of $\overline{h}[n]$ is also concentrated, and $\overline{H}[k]$ can be processed by using the number of discrete Fourier transform points which is equal to the data.

Figure 8:
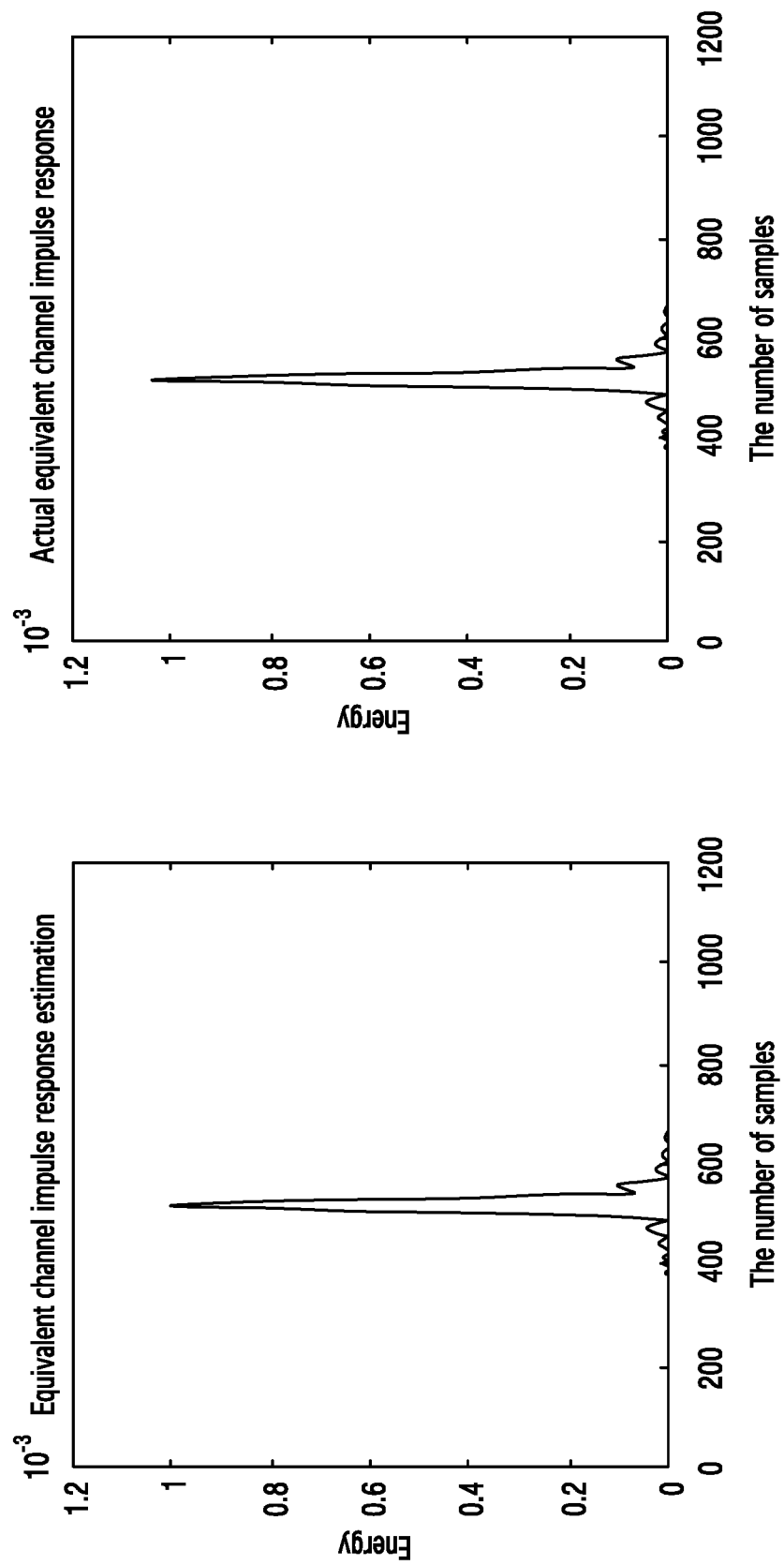
FIG. 8 is a comparison diagram of an equivalent time-domain channel impulse response estimation and an actual time-domain channel impulse response according to the present disclosure.

FIG. 8 is a comparison diagram of an equivalent time-domain channel impulse response estimation and an actual time-domain channel impulse response. Wherein, FIG. 8 shows a composition diagram of the estimated $\overline{h}[n]$ when the estimation of $\overline{H}[k]$ is accurate and an actual time-domain channel impulse response, where the number of discrete Fourier transform points is 1024. As can be seen, when the estimation of the equivalent channel frequency response is accurate, an accurate estimation of the corresponding time-domain impulse response can also be obtained. However, when the estimation of the frequency response has an error due to the channel estimation algorithm, interpolation algorithm or other factors, the estimation of the corresponding time-domain impulse response will also have an error. However, for the estimation of inter-symbol interface caused by symbol extension, an accurate estimation can be obtained at this accuracy.

As shown in FIG. 8, due to the time-domain filtering, the equivalent time-domain channel impulse response will be extended by a large length, and on the receiving device, it is manifested as that the current symbol will suffer inter-symbol interference from a previous symbol and inter-symbol interference from a next symbol. With respect to any current symbol, the location of a sample with a maximum value of the equivalent time-domain channel impulse response power is defined as a point 0 (corresponding to the number of samples of 521 in FIG. 8), so that the extension greater than the point 0 is interference generated to the next symbol by the current symbol and the extension less than the point 0 is interference generated to the previous symbol by the current symbol.

As shown in FIG. 8, although the extension of the equivalent time-domain channel impulse response is long, majority of values are approximate to 0. Therefore, it is required to determine a region with obvious inter-symbol interference in order to determine the location of the receive detection window. As an optional method, a certain power threshold $P_\gamma$ is determined, and the location $\tau_1 > 0$ determined within a region greater than the point 0 satisfies the following condition:

$$P(\overline{h}[n \geq \tau_1]) \leq P_\gamma$$

In other words, the power of the time-domain impulse response greater than or equal to the sample $\tau_1$ is not greater than the power threshold $P_\gamma$. The location $\tau_2 < 0$ determined within a region less than the point 0 satisfies the following condition:

$$P(\overline{h}[n \leq \tau_2]) P_\gamma$$

In other words, the power of the time-domain impulse response less than or equal to the sample $\tau_2$ is not greater than the power threshold $P_\gamma$. Thus, based on the above definitions, a region with obvious inter-symbol interference is $[\tau_2, \tau_1]$.

With respect to any current symbol, the location of the sample of the maximum value of the power of time-domain channel impulse response of the previous symbol is defined as a point 0, and a region with serious inter-symbol interference from the previous symbol to this symbol is a region between a sample 0 and a sample $\tau_1$; and, a region with serious interference from the next symbol to this symbol is a region between a sample M+$\tau_2$ to a sample M, where M is the current F-OFDM symbol added with a CP. To reduce the influence of the inter-symbol interference, the location of a time-domain window function (i.e., the receive detection window) should be disposed within a region without serious inter-symbol interference, i.e., samples $[\tau_1, M+\tau_2]$.

The selection of the power threshold $P_\gamma$ is related to the used MCS. Specifically, if the used modulation scheme is lower, the selected power threshold $P_\gamma$ is higher. This is because the tolerable inter-symbol interference is higher if the Euclidean distance of a low-order modulation constellation point symbol is larger. Thus, a higher power threshold can be used. In contrast, if the Euclidean distance of a high-order modulation constellation point symbol is lower, the tolerant inter-symbol interference is lower. Thus, a lower power threshold is required to eliminate higher inter-symbol interference.

Within this region, $\tau_1$ accounts for the frequency-selective fading caused by multiple paths and inter-symbol interference from the previous symbol resulted from symbol extension caused by the time-domain filtering, while $M+\tau_2$ accounts for the inter-symbol interference from the next symbol resulted from symbol extension caused by time-domain filtering. The selection of a region between the two samples can effectively eliminate the inter-symbol interference. However, since the length of a receive detection window function is fixed as the number N of discrete Fourier transform points, and when the number of samples within $[\tau_1, M+\tau_2]$ is less than N, inter-symbol interference from adjacent symbols will still inevitably fall into the receive detection window. In this case, a preferred window function selection criterion is required to determine the location of the window function.

The basis for the selection criterion is that the inter-symbol interference falling into the receive detection window is lowest. Based on the criterion, a standard for measuring the inter-symbol interference is proposed: the inter-symbol interference $I_1(n_1)$ within a sample interval $[n_1, \tau_1]$ to be estimated is measured by the following formula:

$$I_1(n_1) = \begin{cases} \sum_{i=n_1}^{\tau_1} |\bar{h}[i]|^2, & 0 \le n_1 \le \tau_1 \\ 0, & \text{others} \end{cases}$$

The above formula represents that the inter-symbol interference within this interval is measured by using a sum of sample powers of the equivalent time-domain impulse response within the interval $[n_1, \tau_1]$.

The inter-symbol interference $I_2(n_2)$ within the interval $[M+\tau_2, n_2]$ is measured by the following formula:

$$I_2(n_2) = \begin{cases} \sum_{i=M+\tau_2}^{n_2} |\bar{h}[i-M]|^2, & M+\tau_2 \le n_2 \le M \\ 0, & \text{others} \end{cases}$$

In other words, the inter-symbol interference within this interval is measured by using a sum of sample powers of the equivalent time-domain impulse response within the interval $[M+\tau_2, n_2]$.

According to the above criterion and the measurement standard, solutions for determining the location of the receiving window are as follows.

If $M+\tau_2-\tau_1 \ge N$, any continuous samples within the interval $[\tau_1, M+\tau_2]$ are selected. That is, the receive detection window is located at any location within the interval $[\tau_1, M+\tau_2]$. For example, $[\tau_1+1, N+\tau_1]$ or $[M+\tau_2-N+1, M+\tau_2]$ can be selected as the receive detection window. In other words, the starting location of the receive detection window can be any value within the interval $[\tau_1, M+\tau_2-N+1]$.

If $M+\tau_2-\tau_1 < N$, it is indicated that there are no enough samples within the interval $[\tau_1, M+\tau_2]$, and thus the inter-symbol interference will be inevitably imported into the receive detection window. In this case, the location of the receive detection window is selected by taking the inter-symbol interference within the receive detection window into consideration. If it is assumed that the starting location of the receive detection window is $n_k$, considering that the length of the receive detection window is N, the value range of $n_k$ is $[0, M-N]$. When the starting location of the receive detection window is defined as $n_k$, the inter-symbol interference falling into the receive detection window is:

$$I_{n_k} = I_1(n_k) + I_2(n_k+N)$$

By traversing all possible values of $n_k$, the $n_k$ with a minimum $I_{n_k}$ is selected as the starting location of the receive detection window.

It is to be noted that the above estimation and measurement method for inter-symbol interference described above is merely a preferred method, and other estimation and measurement methods can also be used in the implementations of the present disclosure.

Figure 9:
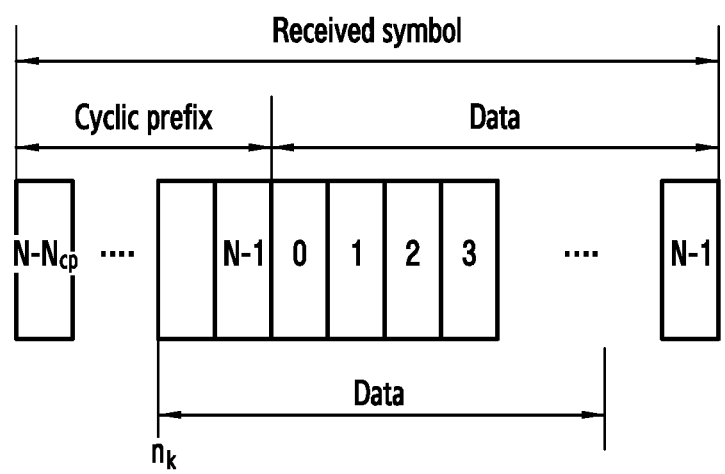
FIG. 9 is a schematic diagram of a receive detection window according to a specific embodiment of the present disclosure.

It can be seen from the above description that, sliding the receive detection window according to the inter-symbol interference will result in the overlap of a part of the receive detection window with the cyclic prefix, as shown in FIG. 9.

FIG. 9 is a schematic diagram of a receive detection window according to a specific embodiment. Wherein, $N_{CP}$ is a length of the cyclic prefix. Due to the forward shift of the receive detection window, a part of the cyclic prefix is contained within the receive detection window. In this case, a time-domain symbol sample within the receive detection window is a cyclic shift of time-domain symbol sample during the data transmission. Since the time-domain sequence cyclic shift corresponds to the phase rotation of a frequency-domain sequence, this cyclic shift can be offset in the frequency-domain, or an equivalent channel having passed through the cyclic shift is directly estimated.

If the receiving device finds that there are no enough samples within the interval $[\tau_1, M+\tau_2]$, and if the imported inter-symbol interface is larger than a certain threshold regardless of the location of the window function, it is indicated that the current filter characteristic or channel condition is poor and it is unable to reduce the inter-symbol interface to an acceptable level by shifting the receive detection window forward. In this case, the receiving device requests a transmitting device to add an additional cyclic prefix via an uplink control channel or an uplink shared channel, i.e., extending the length of the cyclic prefix or adding a cyclic postfix. Specifically, if the inter-symbol interference from the previous symbol is large since $|\tau_1|$ is large, an additional cyclic prefix is requested to be added; however, if the inter-symbol interference from the next symbol is large since $|\tau_2|$ is large, a cyclic postfix is requested to be added.

Upon transmitting the request, the receiving device receives a symbol added with an additional cyclic prefix or a cyclic postfix after waiting for k F-OFDM symbols, where k is a pre-defined parameter; or, the receiving device searches for a related indication in a downlink control channel, and the receiving device receives a symbol added with an additional cyclic prefix or a cyclic postfix if receiving an indication of adding an additional redundancy. Wherein, this indication comprises not only an indication of the way of adding, but also related parameters, for example, an indication of the length of the additional cyclic prefix, an indication of the length of the cyclic postfix, or more.

It is to be noted that the above solutions in Embodiment 1 are specific to a system in which the receiving device has known the filter information and can perform matched filtering on the receiving device side. For a system in which the receiving device does not know the time-domain filter information, i.e., a system in which the filter is transparent to the receiving device, the solutions provided in this embodiment are still available. In this case, the structure diagram of the receiving device is shown in FIG. 10.

Figure 10:
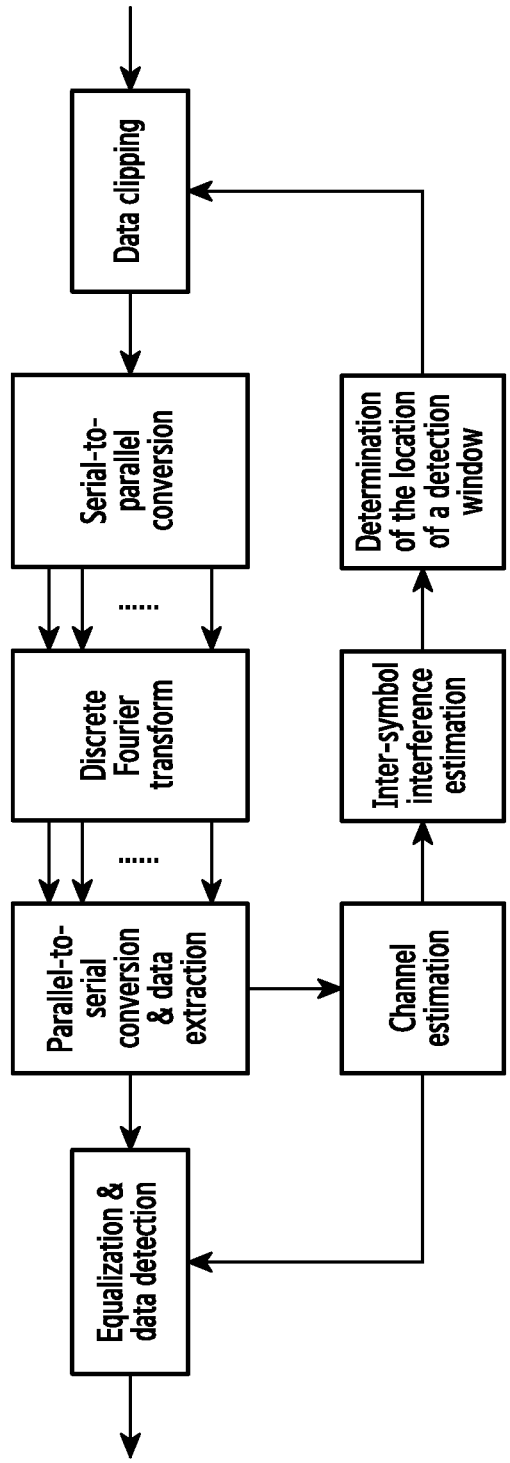
FIG. 10 is a structure diagram of a receiving device when the receiving device does not know time-domain filter information according to the present disclosure.
Figure 11:
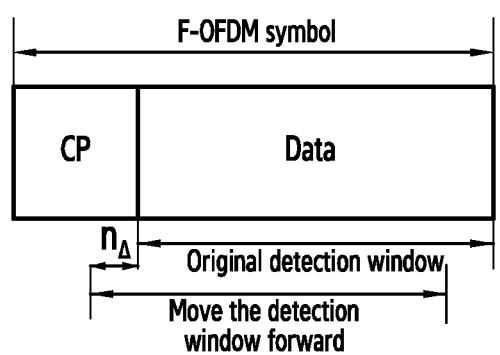
FIG. 11 is a schematic diagram of a forward shift of the location of a transmitting device receive detection window according to Embodiment 2 of the present disclosure.

In the structure diagram of the receiving device shown in FIG. 10, since the receiving device does not know the filter information, it is unable to perform time-domain filtering. Due to the distortion of a spectrum on a sub-band edge because of filtering, estimation is performed by a channel estimation assisted by a reference signal, or pre-offset is performed on a transmitting device. The removal of the matched filter does not influence the implementation of the solutions in this embodiment, and the receiving device still estimates an equivalent channel by the reference signal, then estimates inter-symbol interference by the equivalent channel and finally determines the location of the receive detection window. A difference between this solution and the above solutions lies in that the equivalent channel is an impulse response having passed through transmitting time-domain filtering and the actual physical channel, i.e., $h_i[n] * f_t[n]$.

In addition, it is to be noted that, for the solutions provided in this embodiment, an optimal estimation flow is as follows: inter-symbol interference generated by the previous symbol with respect to this symbol is obtained by channel estimation of the previous symbol, and then inter-symbol interface generated by the next symbol with respect to this symbol is obtained by channel estimation of the next symbol. The location of the receive detection window of this symbol is determined by the inter-symbol interference estimation from the previous symbol and the inter-symbol interference estimation from the next symbol. The above flow can obtain accurate estimation of the inter-symbol interference, so that the arrangement of the receive detection window can avoid majority of inter-symbol interferences. However, in the above flow, demodulation can be performed on this symbol only after the inter-symbol interference estimation from the next symbol is obtained, so that an obvious delay, i.e., a delay of one carrier modulation symbol length, is imported. In addition, based on the solutions provided in this embodiment, in order to estimate the inter-symbol interference, it is required to estimate a frequency-domain channel response first. Thus, a certain symbol will be operated by repeatedly using discrete Fourier transform if this flow is employed. Accordingly, additional complexity is caused.

Therefore, considering the complexity, delay and other limitations in practical application, a preferred flow for the estimation scheme is as follows: after determining the location of the receive detection window of the current symbol, performing channel estimation on the current symbol for use in demodulation, decoding or other operations of the data; according to the channel estimation of the current symbol, estimating inter-symbol interference generated to the previous symbol by the current symbol and inter-symbol interference generated to the next symbol by the current symbol, using the inter-symbol interference generated to the next symbol as interference generated to the next symbol by a symbol before the next symbol, and using an estimated value of the inter-symbol interference generated to the previous symbol by the current symbol as interference generated to the next symbol by a symbol following the next symbol, so as to determine the location of a receive detection window of the next symbol.

In the above flow, the inter-symbol interference estimation generated to the next symbol by the previous symbol is relatively accurate, but the interference generated to the previous symbol by the next symbol can have an error. However, considering that the influence of a channel is mainly manifested on the interference generated to the next symbol by the previous symbol, and the interference length generated to the previous symbol by the next symbol is mainly determined by the filter characteristic, the error is not quite obvious.

For the determination of the location of the receive detection window, in order to reduce the complexity of estimation calculation, a way of periodically determining the location of the receive detection window can be employed. In other words, after the location of a receive detection window is determined for a certain symbol, the location of the receive detection window is used for the data detection of a number of subsequent symbols until the next determination of the location of the receive detection window is performed. The period depends on the strength of the channel time selective fading. That is, the higher the channel time selective fading is, the shorter the period is; in contrast, the lower the channel time selective fading is, the longer the period is.

It is also possible to determine the location of the receive detection window non-periodically. In other words, an SINR is counted after the data detection of each symbol, and the channel estimation of this symbol is used to determine the location of a receive detection window of a next symbol if the SINR is lower than a pre-defined threshold.

The periodic and non-periodic determination of the location of the receive detection window can be combined. That is, a long period is used, and the receiving device detects the SINR of data detection for triggering the non-periodic estimation of the location of the receive detection window.

The above flow can reduce the delay and detects the complexity of the estimation, and is more suitable for a practical system.

The solutions provided by this embodiment are specific to a filtering-based OFDM system, and also applicable to other filtering-based carrier modulation systems, for example, a filtering-based Single Carrier-Frequency Division Multiple Access (SC-FDMA) system.

Embodiment 2

In this embodiment, an F-OFDM receiving system capable of adaptively adjusting the location of a receive detection window will be described in detail in combination with a specific system configuration. In the example of Embodiment 1, a receiving device determines the location of the receive detection window according to the strength of the inter-symbol interference, while a transmitting device does not perform any additional processing. In this embodiment, the transmitting device assists the receiving device to complete an F-OFDM receiving process of adaptively adjusting the location of the receive detection window. The system configuration is described as in Embodiment 1.

The transmitting device assists the receiving device by the following schemes.

Scheme 1: The transmitting device specifies a forward-shift amount of the location of the receive detection window.

Figure 15:
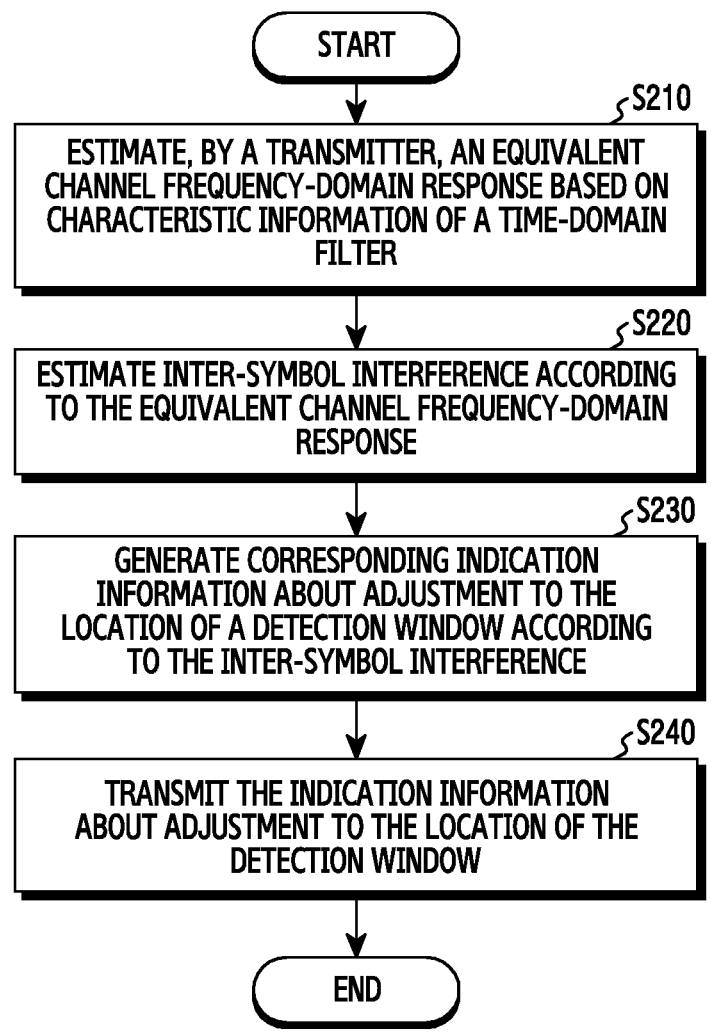
FIG. 15 is a schematic flowchart of a filtering-based carrier modulation signal transmission method according to another embodiment of the present disclosure.

FIG. 15 is a schematic flowchart of a filtering-based carrier modulation signal transmission method according to another embodiment of the present disclosure.

At step S210, an equivalent channel frequency response is estimated by a transmitting device based on characteristic information of a time-domain filter.

At step S220, inter-symbol interference is estimated according to the equivalent channel frequency response.

At step S230, corresponding indication information about adjustment to the location of a receive detection window is generated according to the inter-symbol interference.

At step S240, the indication information about adjustment to the location of the receive detection window is transmitted. Here, the characteristic information of the time-domain filter comprises characteristic information of the transmitting device time-domain filtering and characteristic information of the receiving device matched filtering.

Preferably, estimating inter-symbol interference according to the equivalent channel frequency response specifically comprises: with respect to any symbol, determining a maximum sample value corresponding to a maximum value of the equivalent time-domain channel impulse response power of a previous symbol or a next symbol; determining a third sample value of the next symbol according to the equivalent time-domain channel impulse response, the equivalent time-domain channel impulse response power of sample values before the third sample value being lower than a pre-defined third power threshold; extracting the number of samples between the maximum sample value and the third sample value as a third symbol extension from the previous symbol or the next symbol with respect to any symbol; and according to the third symbol extension estimation and a corresponding equivalent time-domain channel impulse response power, estimating inter-symbol interference from the previous symbol and inter-symbol interference from the next symbol with respect to any symbol.

In other words, with respect to a symbol, the receiving device determines a maximum sample value corresponding to a maximum value of a power of an equivalent time-domain channel impulse response for a previous symbol or a next symbol, determines a sample value of the next symbol based on a value of a power of the equivalent time-domain channel impulse response lower than a threshold, extracts a number of samples between the maximum sample value and the sample value as a symbol extension from the previous symbol or the next symbol with respect to the symbol, and, based on the symbol extension and a corresponding equivalent time-domain channel impulse response power, estimates the inter-symbol interference from the previous symbol and the inter-symbol interference from the next symbol with respect to the symbol.

Preferably, based on characteristic information of a time-domain filter and in combination with channel state information, an equivalent channel frequency response is estimated by the transmitting device. That is, the equivalent channel frequency response is estimated based on the channel state information.

Here, the corresponding indication information about adjustment to the location of the receive detection window is generated according to the inter-symbol interference in any one of the following ways: determining the location of a receive detection window according to the inter-symbol interference estimation, and generating corresponding indication information about an estimated value of forward-shift amount of the location of the receive detection window (that is, determining the location of the receive detection window according to the inter-symbol interference and generate the indication information regarding an estimated value of forward-shift amount of the location of the receive detection window); and using an estimated value of the inter-symbol interference as the indication information about adjustment to the location of the receive detection window (That is, using an estimated value of the inter-symbol interference as the indication information regarding the adjustment of the location of the receive detection window).

The receiving device receives, from the transmitting device, the indication information about adjustment to the location of the receive detection window; and, according to the inter-symbol interference estimation and in combination with the received indication information about adjustment to the location of the receive detection window, the location of the receive detection window is determined.

In some embodiments, the indication information about adjustment to the location of the receive detection window is determined by inter-symbol interference that is estimated by the transmitting device according to characteristic information of a time-domain filter.

In some embodiments, the indication information about adjustment to the location of the receive detection window is determined by inter-symbol interference that is estimated by the transmitting device according to the characteristic information of the time-domain filter and in combination with channel state information.

In some embodiments, the indication information about adjustment to the location of the receive detection window comprises indication information about an estimated value of the forward-shift amount of the location of the receive detection window or indication information about an estimated value of the inter-symbol interference.

The transmitting device predetermines the forward-shift amount of the location of the receive detection window, then generates corresponding indication information about adjustment to the location of the receive detection window, and transmits the indication information about adjustment to the location of the receive detection window to the receiving device via a broadcast channel, a control channel or a data channel. Upon receiving the indication information, the receiving device adjusts the location of the receive detection window on the basis of the original receive detection window according to the forward-shift amount of the location of the receive detection window, and then performs demodulation and detection on subsequent data. Specifically, as shown in FIG. 10, the original location of the receive detection window is determined according to a cyclic length position, and the cyclic prefix is removed to reserve a complete data sequence in a correct order; and, upon receiving the indication of the forward-shift amount of the location of the receive detection window transmitted by the transmitting device, the location of the receive detection window is moved forward by $n_A$ samples according to this indication, for receiving and detecting data.

The transmitting device determines the forward-shift amount of the location of the receive detection window according to the strength of channel frequency selectivity and the characteristics of the used time-domain filter. Specifically, the transmitting device estimates the strength of channel frequency selective fading according to the channel state information fed back by the receiving device; or in a Time Division Duplex (TDD) mode, the transmitting device determines the strength of channel frequency selective fading by the channel reciprocity and by the channel estimation of an uplink channel. Based on the estimation of the frequency selective fading and in combination with the characteristics of the time-domain filter (i.e., the strength of symbol extension caused by time-domain filtering), a proper forward-shift amount of the location of the receive detection window is determined. A specific way can refer to the way of determining the location of a transmitting device receive detection window as described in Embodiment 1.

Considering that the characteristics of the filter are related to the sub-band bandwidth, the transmitting device can predetermine a forward-shift amount of the receive detection window corresponding to the bandwidth of each sub-band, and implicitly informs the receiving device of the forward-shift amount of the receive detection window through the sub-band bandwidth. Specifically, if the sub-band bandwidth is narrower, it is more difficult to concentrate the energy of the time-domain filter, and the inter-symbol interference caused by time-domain filtering is more serious. In this case, the forward-shift amount of the receive detection window should be larger.

The transmitting device adjusts the forward-shift amount of the location of the receive detection window in real time according to the estimation of the channel state information, so that the purpose of adaptively adjusting the receiving window is achieved.

Scheme 2: The transmitting device transmits an estimated value of the forward-shift amount of the location of the receive detection window.

The transmitting device determines an estimated value of the forward-shift amount of the location of the receive detection window, then generates corresponding indication information about adjustment to the location of the receive detection window, and transmits the indication information about adjustment to the location of the receive detection window to the receiving device.

Preferably, the receiving device receives, from the transmitting device, the indication information about adjustment to the location of the receive detection window; and, according to the inter-symbol interference estimation and in combination with the received indication information about adjustment to the location of the receive detection window, the location of the receive detection window is determined.

The transmitting device determines and transmits an estimated value of the forward-shift amount of the receive detection window according to the characteristics of a sub-band time-domain filter, and assists the receiving device to complete the adjustment to the location of the receive detection window. Specifically, the transmitting device obtains the estimated value of the forward-shift amount of the receive detection window according to the estimation of channel state information and the characteristics of the time-domain filter used by the sub-band, and then transmits, in a way of an indication of the estimated forward-shift amount of the location of the receive detection window, the estimated value to the receiving device via a broadcast channel, a control channel or a shared channel. According to the received indication, the receiving device performs interference detection in the vicinity of the forward-shift amount of the location of the receive detection window estimated by the transmitting device, so as to obtain the final location of the receive detection window for use in the detection and demodulation of subsequent signals.

Figure 12:
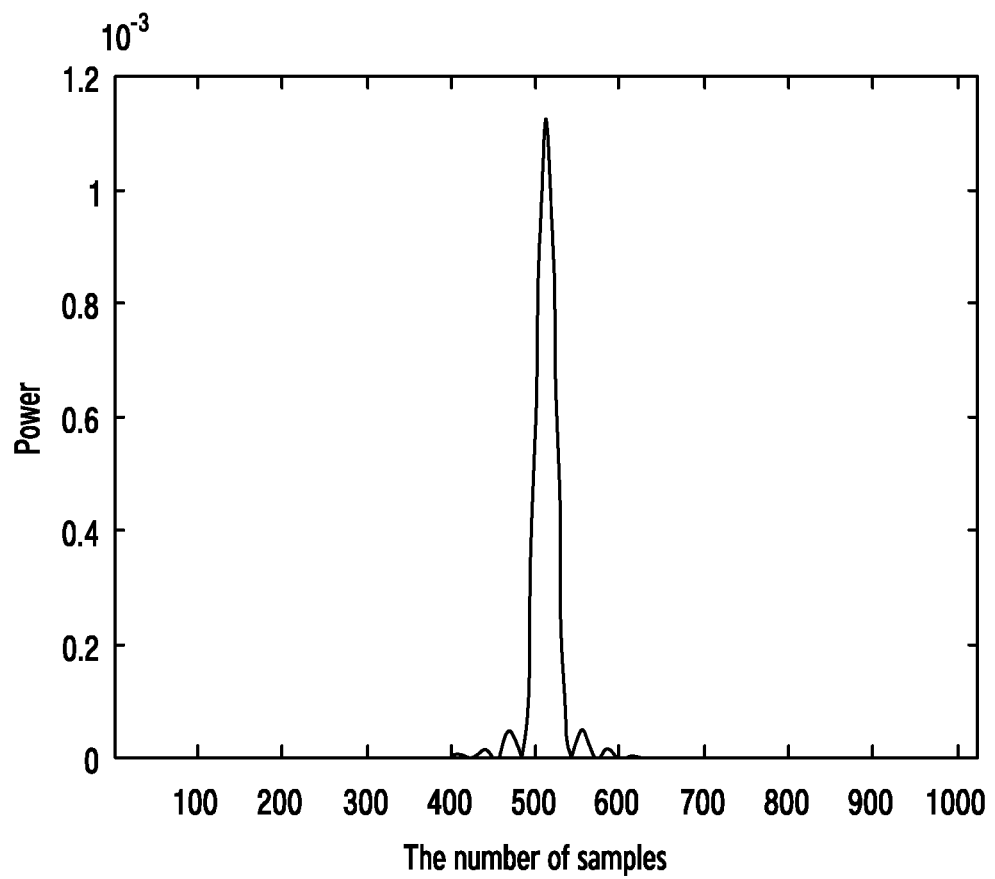
FIG. 12 is a schematic diagram of an equivalent time-domain channel impulse response by taking only transmitting device time-domain filtering and receiving device matched filtering into consideration according to Embodiment 2 of the present disclosure.

Specifically, the transmitting device can adopt the method in the forgoing Scheme 1 to estimate the forward-shift amount of the receive detection window; or, only according to the characteristics of the time-domain filter used by the sub-band, the transmitting device gives out the influence of the symbol extension caused by time-domain filtering on the receive detection window. FIG. 12 is a schematic diagram of an equivalent time-domain channel impulse response by taking only transmitting device time-domain filtering and receiving device matched filtering into consideration.

For a sub-band l, the transmitting device estimates an equivalent channel $\tilde{h}\_1[n]=f\_1[n]*f\_1^*[-n]$ having passed through transmitting device time-domain filtering and receiving device matched filtering only, then sets a power threshold and determines a tail length of the equivalent channel. As shown in FIG. 12, the bandwidth of the sub-band is 540 kHz, and the used time-domain filter is as shown in FIG. 8. As can be seen, around the time-domain impulse response power peak, the equivalent channel impulse response has energy distribution. It is indicated that the current symbol will generate interference to both a previous symbol and a next symbol after the time-domain filtering and matched filtering. In addition, as can be seen, the equivalent channel impulse response in FIG. 12, i.e., samples, is symmetrically distributed about the power peak temporally. From the perspective of interference, it has the same influence on the previous symbol and the next previous.

If it is stipulated that the maximum power point of the equivalent channel $\tilde{h}_l[n]$ is a sample 0 and the power threshold is $P_r$, a sample $n_r$ is searched in the sample values greater than 0 which satisfies the condition that $P(\tilde{h}_l[n \geq n_r]) \leq P_r$, and this sample value is used as an estimated value of the forward-shift amount of the receive detection window which is then transmitted to the receiving device.

The selection of the power threshold $P_r$ is related to the modulation order. When the modulation order is lower, the tolerable inter-symbol interference is higher, and a higher power threshold $P_r$ can be selected; however, when the modulation order is higher, the tolerable inter-symbol interference is lower, and a lower power threshold $P_r$ should be selected.

When the transmitting device informs the receiving device of the estimated value of the forward-shift amount of the location of the receive detection window, by means of a lookup table, the transmitting device can transmit the estimated value of the forward-shift amount of the receive detection window to the receiving device by an index. The receiving device obtains, from the lookup table, the estimated value of the forward-shift amount of the location of the receive detection window according to the index.

Considering that the characteristics of the sub-band filter are related to the sub-band bandwidth, for the bandwidth of each sub-band, a corresponding estimated value of the forward-shift amount of the location of the receive detection window can be calculated in advance according to the criterion described above and then bound with the corresponding sub-band bandwidth. Both the transmitting device and the receiving device have known the information about the binding relationship.

The transmitting device merely informs the receiving device of the sub-band bandwidth, and the receiving device infers the estimated value of the forward-shift amount of the location of the receive detection window according to the sub-band bandwidth and based on the information about the binding relationship.

Upon receiving the estimated value of the forward-shift amount of the location of the receive detection window, in combination with the result of channel estimation, the receiving device determines the location of the receive detection window according.

Specifically, the receiving device can move the receive detection window forward according to the estimated value of the forward-shift amount of the location of the receive detection window, and then fix the location of the receive detection window; or, the receiving device slides the receive detection window leftward and rightward according to the forward-shift amount of the location of the receive detection window, and then determines the optimal location of the receive detection window (i.e., the location of the receive detection window with minimal inter-symbol interference) within a certain range. Specifically, the receiving device decides the strength of frequency selective fading of the channel according to the channel estimation. If the channel frequency selectivity is high, the receive detection window can be moved backward based on the estimated value of the forward-shift amount of the location of the receive detection window transmitted by the transmitting device, so as to relieve the influence from the channel frequency selective fading; however, if the channel frequency selectivity is low, the receive detection window can be continuously moved forward based on the estimated value of the forward-shift amount of the location of the receive detection window transmitted by the transmitting device.

Compared with Embodiment 1, the method provided in Embodiment 2 can reduce the implementation complexity of the receiving device, and is advantageous for the realization of a low-complexity receiving device. However, since the receiving device does not estimate the actual symbol extension and inter-symbol interference, the effects of the solutions provided in Embodiment 2 are interior to those of the solutions provided in Embodiment 1. In practice, the solutions provided in Embodiment 1 and the solutions provided in Embodiment 2 can be combined. That is, a rough range of the location of the receive detection window is obtained by the solution provided in Embodiment 2, and then an optimal location of the detection is obtained from this range by the solutions provided in Embodiment 1, so that a compromise between the performance and the complexity is realized.

The solutions provided in this embodiment are also applicable to a system in which the receiving device does not know filter information, that is, the filter is transparent to the receiving device. In this case, in the second method, the transmitting device needs to consider the extension of a receiving device time-domain filter only.

Embodiment 3

In this embodiment, an F-OFDM receiving system capable of adaptively adjusting the location of a receive detection window will be described in detail in combination with a specific system configuration. In some configurations, for example, in a case of a very narrow sub-band bandwidth, it is unable to effectively reduce inter-symbol interference caused by channel delay and time-domain filtering by sliding a receive detection window. In this case, the inter-symbol interference needs to be reduced by adding an additional cyclic prefix or a cyclic postfix.

Figure 13A:
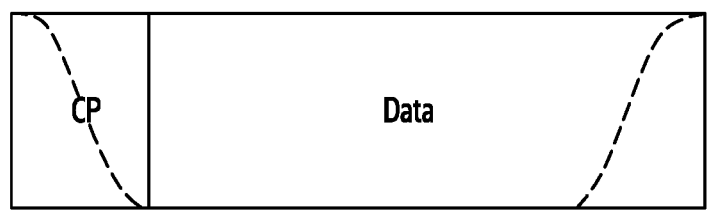
FIGS. 13A to 13C are schematic diagrams of adding an additional cyclic prefix or cyclic postfix to a symbol according to Embodiment 3 of the present disclosure.
Figure 13B:
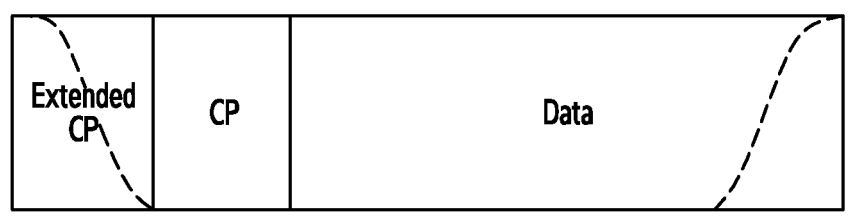
Figure 13C:
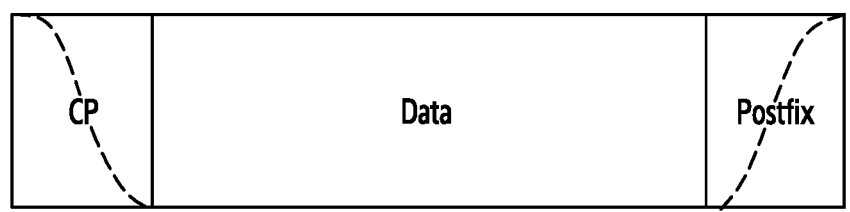

FIGS. 13A to 13C are schematic diagrams of adding an additional cyclic prefix or a cyclic postfix to a symbol when the sub-band bandwidth is very narrow. In FIG. 13A, since the sub-band bandwidth is very narrow, it is difficult to design a time-domain filter with concentrated energy, so that the symbol extension caused by time-domain filtering is serious. It is difficult to reduce the inter-symbol interference caused by symbol extension and channel delay to an acceptable level, by adaptively adjusting a receive detection window by a receiving device. In this case, the transmitting device needs to perform some additional processing.

FIG. 13B and FIG. 13C show two possible processing ways. As shown in FIG. 13B, an additional CP is added on the basis of the original CP, in order to reduce the inter-symbol interference. In this case, the starting location of the receive detection window is at the ending location of the additional CP. In FIG. 13C, a cyclic postfix is added to the symbol in order to reduce the inter-symbol interference. In this case, the receiving device adds a receive detection window still in accordance with the length of the cyclic prefix.

Although the ways shown in FIG. 13B and FIG. 13C can reduce the inter-symbol interference, in some cases, for example, in a case where the channel condition is severe and the channel delay is long, the extension formed when the signal passes through a channel is overlapped with the extension caused by time-domain filtering, so that the influence thereof on the next symbol can be more serious than an extended CP (corresponding to the solution in FIG. 13B) or a conventional CP (corresponding to the solution in FIG. 13C). In this case, it is still required to adaptively adjust the location of the receive detection window by the receiving device, in order to reduce the influence of the inter-symbol interference on the system performance and link reliability.

Similar to Embodiment 1, a criterion for adjusting the location of the receive detection window is that the inter-symbol interference falling into the receive detection window is minimized. The adopted method is also similar to that in Embodiment 1. That is, an equivalent time-domain channel impulse response having passed through transmitting device time-domain filtering, an actual physical channel and receiving device matched filtering is estimated by using channel estimation based on a reference signal; then, a region with a maximum influence of the inter-symbol interference generated by a previous symbol on the current symbol and a region with a maximum influence of the inter-symbol interference generated by a next symbol on the current symbol are obtained according to a pre-defined power threshold; and, a region with minimum inter-symbol interference is selected as a receive detection window. The specific way will not be repeated here.

Figure 14:
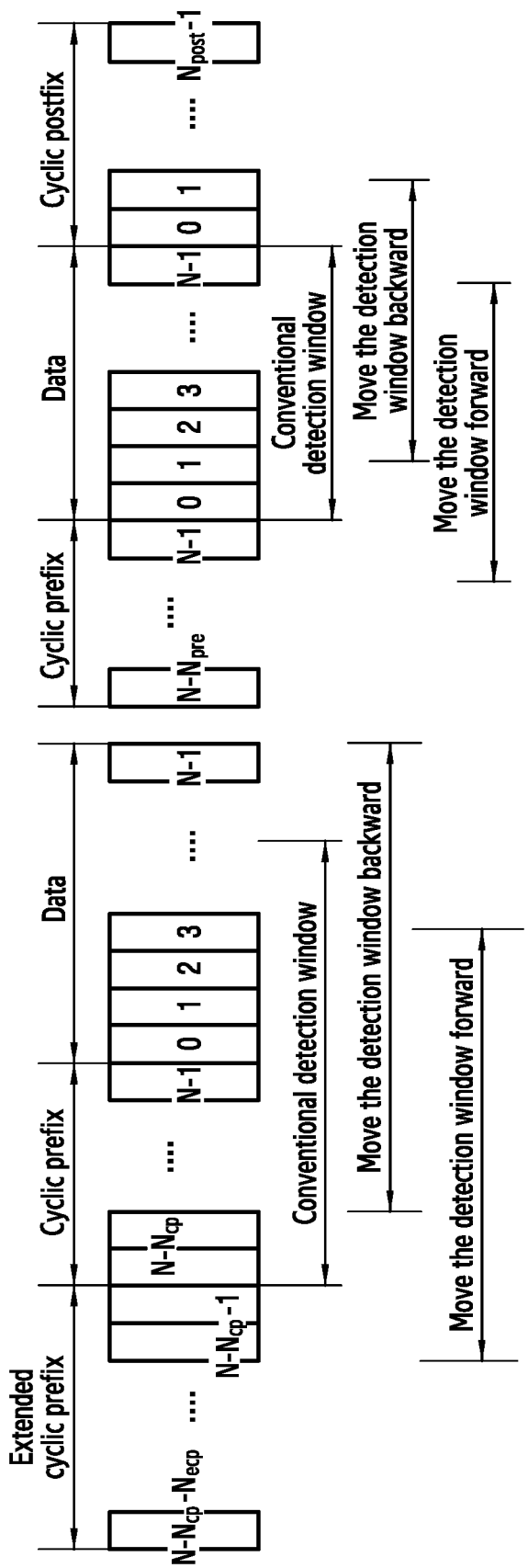
FIG. 14 is a schematic diagram of movement of the location of a receive detection window according to Embodiment 3 of the present disclosure.

A difference between this embodiment and Embodiment 1 lies in that the location of the receive detection window can be moved forward or backward in this embodiment. FIG. 14 shows ways of moving the location of the receive detection windows in the two methods shown in FIG. 13B and FIG. 13C. Wherein, the way of adding an extended cyclic prefix in FIG. 13B is equivalent to extending the length of a cyclic prefix. Based on a conventional receive detection window, the receive detection window can be adaptively moved forward or backward, but a sequence falling into the receive detection window after the movement is a cyclic shift of the original sequence. However, in the way of adding a cyclic postfix in FIG. 13C, a sequence falling into the receive detection window is also a cyclic shift of the original sequence.

The way of determining, by the receiving device, the location of the receive detection window according to the indication from the transmitting device in Embodiment 2 is also applicable to the solutions provided in this embodiment. Specifically, the transmitting device infers a downlink channel from the uplink channel estimation according to the channel state information fed back by the receiving device, or by using the channel reciprocity in a TDD mode, and then obtains, in combination with the time-domain filter, an equivalent channel having passed through a time-domain filter, an actual physical channel and a matched filter; and, the transmitting device obtains inter-symbol interference from a previous symbol and inter-symbol interference from a next symbol according to the equivalent channel, then determines the location of a receive detection window with minimal interference within the window, and transmits, in the way of an indication information about adjustment to the location of the receive detection window, a movement amount of the receive detection window to the receiving device via a broadcast channel, a downlink control channel or a downlink shared channel.

Or, the transmitting device determines symbol extension caused by time-domain filtering according to the characteristics of the time-domain filter, and transmits, in the way of an indication of symbol extension, the symbol extension to the receiving device via a broadcast channel, a downlink control channel or a downlink shared channel. The symbol extension indication merely considers the inter-symbol interference caused by time-domain filtering. The receiving device determines the location of the receive detection window based on the symbol extension and in combination with the channel estimation. Specifically, when the channel frequency selective fading is low, the receive detection window is moved forward by a larger number of samples based on the symbol extension indication; when the channel frequency selective fading is moderate, the receive detection window is moved forward by a smaller number of samples or not moved based on the symbol extension indication; and, when the channel frequency selective fading is high, the receive detection window is moved backward based on the symbol extension indication.

The case described in this embodiment occurs when the sub-band bandwidth is very narrow and the channel condition is poor, for example, when the channel delay is large or the speed of movement of the receiving device is rapid. Meanwhile, the solutions provided in this embodiment are also applicable to a default case where both a cyclic prefix and a cyclic postfix are transmitted. Similar to the two embodiments described above, the solutions provided in this embodiment are also applicable to a system in which the receiving device does not know filter information, that is, the time-domain filter is transparent to the receiving device.

Figure 16:
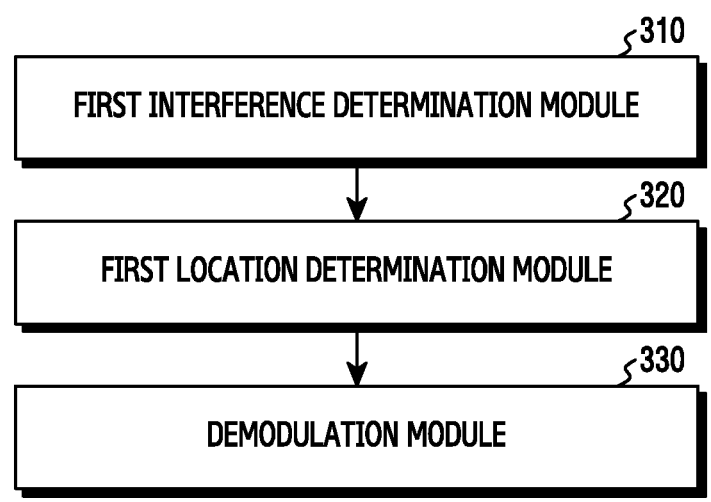
FIG. 16 is a structure diagram of a filtering-based carrier modulation signal receiving device according to still another embodiment of the present disclosure.

FIG. 16 is a structure diagram of a filtering-based carrier modulation signal receiving device according to still another embodiment of the present disclosure. Wherein, the receiving device comprises a first interference determination module 310, a first location determination module 320 and a demodulation module 330.

The first interference determination module 310 determines inter-symbol interference; the first location determination module 320 determines the location of a receive detection window according to the inter-symbol interference; and, the demodulation module 330 detects and demodulates a received signal based on the location of the receive detection window.

Figure 17:
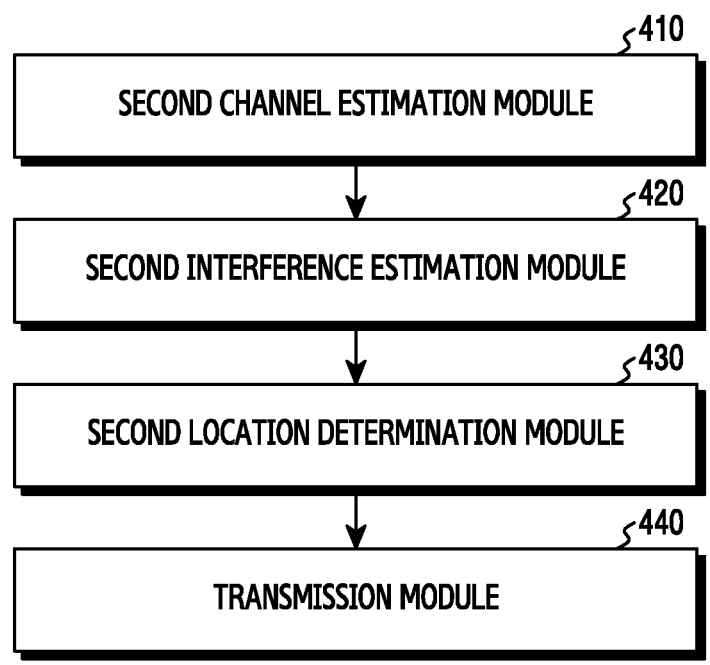
FIG. 17 is a structure diagram of a filtering-based carrier modulation signal transmitting device according to yet another embodiment of the present disclosure.

FIG. 17 is a structure diagram of a filtering-based carrier modulation signal transmitting device according to yet another embodiment of the present disclosure. Wherein, the transmitting device comprises a second channel estimation module 410, a second interference estimation module 420, a second location determination module 430 and a transmission module 440.

The second channel estimation module 410 estimates an equivalent channel frequency response based on characteristic information of a time-domain filter; the second interference estimation module 420 estimates inter-symbol interference according to the equivalent channel frequency response; the second location determination module 430 generates corresponding indication information about adjustment to the location of a receive detection window according to the inter-symbol interference; and, the transmission module 440 transmits the indication information about adjustment to the location of the receive detection window.

Figure 18:
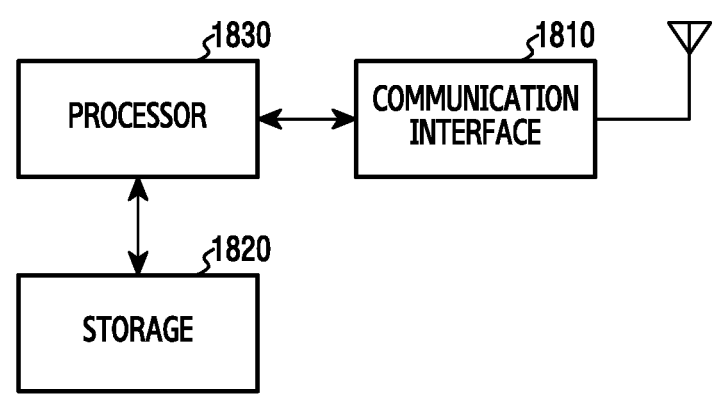
FIG. 18 illustrates a block diagram of a receiving device according to various embodiments of the present disclosure.

FIG. 18 illustrates a block diagram of a receiving device according to various embodiments of the present disclosure. FIG. 18 exemplifies elements of the receiving device in the wireless communication system. In various embodiments, the receiving device can be a portable electronic device, and can be one of a smart phone, a portable terminal, a mobile phone, a mobile pad, a media player, a tablet computer, a handheld computer, and a personal digital assistant (PDA). Furthermore, the receiving device can be a device that implements the functions of two or more of the aforementioned devices.

Terms, such as "unit", "device", etc., as used herein, refer to a unit for processing at least one function or operation, and the unit can be implemented by hardware, software, or a combination thereof. Referring to FIG. 18, the receiving device includes a communication interface 1810, a storage 1820, and a processor 1830.

The communication interface 1810 performs a function for transmitting and receiving signals through a wireless channel. For example, the communication interface 1810 performs a function of conversion between a baseband signal and a bit stream according to a physical layer standard of the system. For example, the communication interface 1810 generates complex symbols by encoding and modulating a transmission bit stream when transmitting data. Furthermore, the communication interface 1810 restores a reception bit stream by demodulating and decoding a baseband signal when receiving data. The communication interface 1810 can be referred to as the transceiver. The communication interface 1810 includes a transmitter and a receiver. For example, the communication interface 1810 can include a transmission filter, a reception filter, an amplifier, a mixer, an oscillator, a digital-to-analog converter (DAC), an analog-to-digital converter (ADC), etc.

The storage 1820 stores data, such as a basic program, an application program, and setup information, for the operation of the receiving device. In particular, the storage 1820 can store a code book for feedback of channel information.

The processor 1830 controls overall operations of the receiving device. For example, the processor 1830 transmits and receives signals through the communication interface 1810. Furthermore, the processor 1830 records data in the storage 1820 and reads the data from the storage 1820. For this purpose, the processor 1830 can include at least one processor. For example, the processor 1830 can include a communication processor (CP) that performs control for communication and an application processor (AP) that controls an upper layer, such as an application program, etc.

In FIG. 18, it is described that the elements communication interface 1810, storage 1820 and processor 1830 are included in the receiving device. However, transmitting device can also include the elements communication interface 1810, storage 1820 and processor 1830, and perform operations corresponding to each of the communication interface 1810, storage 1820 and processor 1830.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

It can be understood by those skilled in the art that the steps, measures and solutions in the operations, methods and flows already discussed in the present disclosure can be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and operations disclosed in the present disclosure can also be alternated, changed, rearranged, decomposed, combined or deleted.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for operating a receiving device in a wireless communication system, the method comprising:
   receiving estimation information of inter-symbol interference from a transmitting device;
   determining inter-symbol interference between symbols in a signal received from a transmitting device based on the estimation information;
   determining a location of a receive detection window based on the inter-symbol interference; and
   demodulating the received signal based on the location of the receive detection window,
   wherein the estimation information inter-symbol interference is determined by the transmitting device based on a characteristic information of a time-domain filter of the transmitting device.

2. The method of claim 1, wherein determining the inter-symbol interference between symbols in the received signal comprises:
   estimating an equivalent channel frequency response based on a received reference signal; and
   determining the inter-symbol interference based on the equivalent channel frequency response,
   wherein the equivalent channel frequency response is an estimation of a channel frequency response through the transmitting device time-domain filtering, an actual physical channel and receiving device matched filtering, or through a transmitting device time-domain filtering, an actual physical channel.

3. The method of claim 1, wherein determining the location of the receive detection window based on the inter-symbol interference comprises:
   determining, as the location of the receive detection window, a sample interval with a minimum estimated value of the inter-symbol interference and using a discrete Fourier transform size as a length.

4. The method of claim 3, wherein determining the location of the receive detection window based on the inter-symbol interference comprises:
   calculating a difference between a length of a multi-carrier modulation symbol added with a cyclic prefix, a first symbol extension of a previous symbol associated with the inter-symbol interference and a second symbol extension of a next symbol associated with the inter-symbol interference, and determining a result of the calculation as a symbol length without inter-symbol interference;
   if the symbol length without inter-symbol interference is less than the discrete Fourier transform size, determining, as the location of the receive detection window, a sample interval with a minimum estimated value of the inter-symbol interference and using discrete Fourier transform size as a length; and
   if the symbol length without inter-symbol interference is not less than the discrete Fourier transform size, determine a region with a length equal to the discrete Fourier transform size from sample regions without inter-symbol interference as the location of the receive detection window.

5. The method of claim 1, wherein a starting point of the location of the receive detection window is located within a cyclic prefix.

6. The method of claim 1, wherein demodulating the received signal based on the location of the receive detection window comprises:
   calculating a signal-to-interference-plus-noise ratio (SINR) of the received signal; and
   if the SINR is lower than a pre-defined SINR threshold, determining the location of the receive detection window of a next symbol by using an inter-symbol interference estimation for a previous symbol.

7. The method of claim 1, further comprising:
   receiving indication information regarding an adjustment of the location of a receive detection window,
   wherein the determining of the location of the receive detection window based on the inter-symbol interference comprises:
   based on the inter-symbol interference and the received indication information regarding the adjustment of the location of the receive detection window, determining the location of the receive detection window.

8. A receiving device in a wireless communication system, comprising:
   at least one transceiver; and
   at least one processor configured to:
      receive estimation information of inter-symbol interference from a transmitting device;
      determine inter-symbol interference between symbols in a signal received from a transmitting device based on the estimation information;
      determine a location of a receive detection window based on the inter-symbol interference; and
      demodulate the received signal based on the location of the receive detection window,
   wherein the estimation information is determined by the transmitting device based on a characteristic information of a time-domain filter of the transmitting device.

9. The receiving device of claim 8, wherein the at least one transceiver is further configured to:
   estimate an equivalent channel frequency response based on a received reference signal; and determine the inter-symbol interference based on the equivalent channel frequency response,
wherein the equivalent channel frequency response is an estimation of a channel frequency response through the transmitting device time-domain filtering, an actual physical channel and receiving device matched filtering, or through a transmitting device time-domain filtering, an actual physical channel.

10. The receiving device of claim 8, wherein the at least one processor is further configured to determine, as the location of the receive detection window, a sample interval with a minimum estimated value of the inter-symbol interference and using a discrete Fourier transform size as a length.

11. The receiving device of claim 10, wherein the at least one processor is further configured to:
calculate a difference between a length of a multi-carrier modulation symbol added with a cyclic prefix, a first symbol extension of a previous symbol associated with the inter-symbol interference and a second symbol extension of a next symbol associated with the inter-symbol interference, and determining a result of the calculation as a symbol length without inter-symbol interference;
if the symbol length without inter-symbol interference is less than the discrete Fourier transform size, determine, as the location of the receive detection window, a sample interval with a minimum estimated value of the inter-symbol interference and using discrete Fourier transform size as a length; and
if the symbol length without inter-symbol interference is not less than the discrete Fourier transform size, determine a region with a length equal to the discrete Fourier transform size from sample regions without inter-symbol interference as the location of the receive detection window.

12. The receiving device of claim 8, wherein the at least one processor is further configured to:
calculate a signal-to-interference-plus-noise ratio (SINR) of the received signal; and
if the SINR is lower than a pre-defined SINR threshold, determine the location of the receive detection window of a next symbol by using an inter-symbol interference estimation for a previous symbol.

13. The receiving device of claim 8, wherein the at least one transceiver is further configured to receive indication information regarding an adjustment of the location of a receive detection window,
wherein the at least one processor is further configured to, based on the inter-symbol interference and the received indication information regarding the adjustment of the location of the receive detection window, determine the location of the receive detection window.

14. A transmitting device in a wireless communication system, the transmitting device comprising:
at least one processor configured to:
estimate an equivalent channel frequency response based on characteristic information of a time-domain filter,
estimate an inter-symbol interference based on the equivalent channel frequency response, and
generate indication information regarding an adjustment of a location of a receive detection window based on the inter-symbol interference; and
at least one transceiver configured to transmit the indication information regarding the adjustment of the location of the receive detection window.

15. The transmitting device of claim 14, wherein the characteristic information of the time-domain filter comprises characteristic information of transmitting device time-domain filtering and characteristic information of receiving device matched filtering.

16. The transmitting device of claim 14, wherein the at least one transceiver is further configured to:
with respect to a symbol, determine a maximum sample value corresponding to a maximum value of a power of an equivalent time-domain channel impulse response for a previous symbol or a next symbol;
determine a sample value of the next symbol based on a value of a power of the equivalent time-domain channel impulse response lower than a threshold;
extract a number of samples between the maximum sample value and the sample value as a symbol extension from the previous symbol or the next symbol with respect to the symbol; and
based on the symbol extension and a corresponding equivalent time-domain channel impulse response power, estimate the inter-symbol interference from the previous symbol and the inter-symbol interference from the next symbol with respect to the symbol.

17. The transmitting device of claim 14, wherein the at least one processor is further configured to estimate an equivalent channel frequency response based on channel state information.

18. The transmitting device of claim 14, wherein the at least one processor is further configured to:
determine the location of the receive detection window according to the inter-symbol interference and generate the indication information regarding an estimated value of forward-shift amount of the location of the receive detection window; or
use an estimated value of the inter-symbol interference as the indication information regarding the adjustment of the location of the receive detection window.

* * * * *